United States Patent
Aizawa et al.

(10) Patent No.: US 11,460,309 B2
(45) Date of Patent: Oct. 4, 2022

(54) CONTROL APPARATUS, CONTROL METHOD, AND STORAGE MEDIUM STORING PROGRAM

(71) Applicant: HONDA MOTOR CO., LTD., Tokyo (JP)

(72) Inventors: Naohide Aizawa, Tokyo (JP); Mafuyu Koseki, Tokyo (JP); Takaaki Ishikawa, Wako (JP); Hidekazu Shintani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 16/824,579

(22) Filed: Mar. 19, 2020

(65) Prior Publication Data

US 2020/0309549 A1 Oct. 1, 2020

(30) Foreign Application Priority Data

Mar. 28, 2019 (JP) .............................. JP2019-064026

(51) Int. Cl.
*G01C 21/34* (2006.01)
*G06K 9/00* (2022.01)
(Continued)

(52) U.S. Cl.
CPC ..... *G01C 21/3415* (2013.01); *G01C 21/3484* (2013.01); *G06K 9/6267* (2013.01); *G06V 20/56* (2022.01); *G06V 20/597* (2022.01)

(58) Field of Classification Search
CPC ............ G01C 21/3415; G01C 21/3484; G06K 9/6267
(Continued)

(56) References Cited

U.S. PATENT DOCUMENTS 9,725,036 B1 * 8/2017 Tarte ..................... B60W 50/16
9,945,679 B2 * 4/2018 Bender .............. G06K 9/00845
(Continued)

FOREIGN PATENT DOCUMENTS

JP       2014146289 A  *  8/2014
JP       2014-235078 A    12/2014
WO  WO-2017193018 A1 *  11/2017  ......... G01C 21/3492

OTHER PUBLICATIONS

Christian et al., "Route Generating Algorithm Based on OpenSource Data to Predict the Energy Consumption of Different Vehicles," 2015, Publisher: IEEE.*
(Continued)

*Primary Examiner* — Tuan C To
(74) *Attorney, Agent, or Firm* — Thomas | Horstemeyer, LLP

(57) ABSTRACT

A control apparatus comprises a first information acquisition circuit configured to acquire a recognition result relating to a passenger of a vehicle; a second information acquisition circuit configured to acquire information relating to a surrounding environment of the vehicle; and a vehicle control circuit configured to generate a travel route of the vehicle based on the recognition result acquired by the first information acquisition circuit and the information relating to the surrounding environment acquired by the second information acquisition circuit, wherein the information relating to the surrounding environment includes information relating to a route set according to the recognition result.

17 Claims, 13 Drawing Sheets

(51) Int. Cl.
*G06K 9/62* (2022.01)
*G06V 20/56* (2022.01)
*G06V 20/59* (2022.01)

(58) Field of Classification Search
USPC .......................................................... 701/533
See application file for complete search history.

(56) References Cited

U.S. PATENT DOCUMENTS

| | | | | |
|---|---|---|---|---|
| 10,832,449 | B1* | 11/2020 | Russo | G06F 16/9537 |
| 11,211,157 | B2* | 12/2021 | Perez | G16H 20/30 |
| 11,215,470 | B2* | 1/2022 | Ramtirth | G06V 20/597 |
| 2017/0032480 | A1* | 2/2017 | Wong | G06Q 50/01 |
| 2017/0369077 | A1* | 12/2017 | Hirano | G05D 1/0061 |
| 2017/0370732 | A1* | 12/2017 | Bender | G01C 21/3492 |
| 2018/0037262 | A1* | 2/2018 | Imai | G08G 1/0962 |
| 2018/0059674 | A1* | 3/2018 | Kunisa | G05D 1/0246 |
| 2018/0141547 | A1* | 5/2018 | Fujiki | G05D 1/0214 |
| 2018/0164108 | A1* | 6/2018 | Rahal-Arabi | G01C 21/3484 |
| 2018/0178807 | A1* | 6/2018 | Murata | B60W 50/082 |
| 2018/0210453 | A1* | 7/2018 | Sato | B60W 30/12 |
| 2018/0244286 | A1* | 8/2018 | Sakai | B60W 50/10 |
| 2019/0187704 | A1* | 6/2019 | Gordon | G01C 21/3484 |
| 2019/0187707 | A1* | 6/2019 | Zheng | G01C 21/3658 |
| 2020/0013396 | A1* | 1/2020 | Park | G10L 15/22 |
| 2020/0269653 | A1* | 8/2020 | Rakshit | B60W 40/08 |
| 2021/0397943 | A1* | 12/2021 | Ribalta | G06N 3/0454 |

OTHER PUBLICATIONS

Can et al., "Model Based Route Guidance for Hybrid and Electric Vehicles," 2015, Publisher: IEEE.*
John et al., "Prototype for Importing Routes Generated for Realistic Simulation of Vehicles," 2014, Publisher: IEEE.*

* cited by examiner

F I G. 12
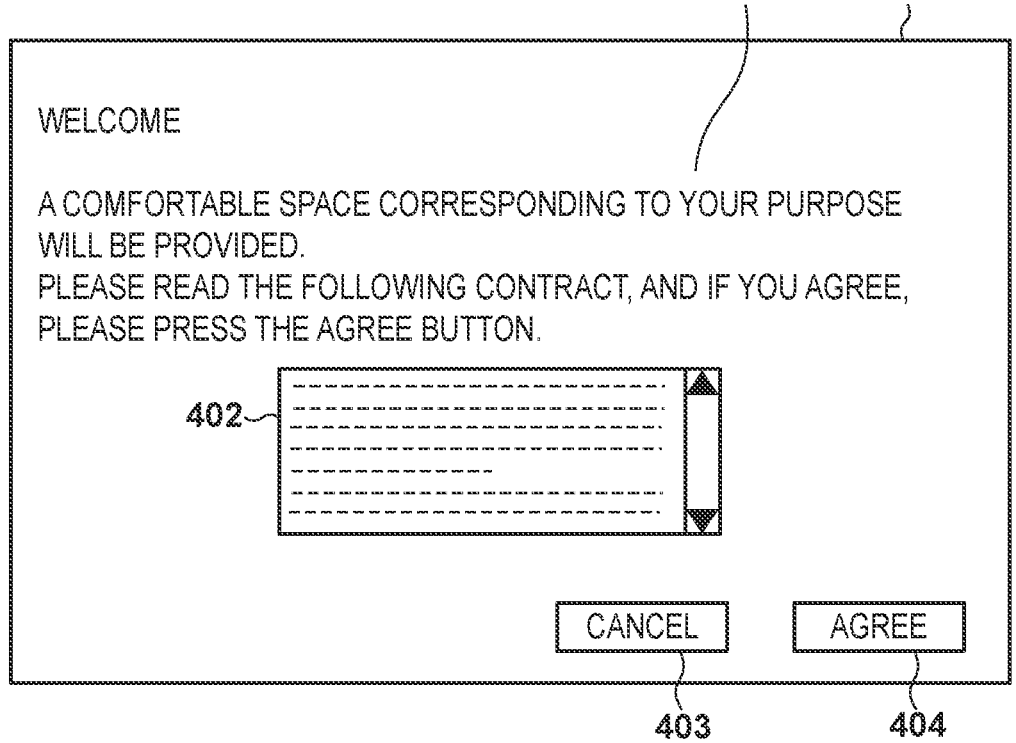
F I G. 13
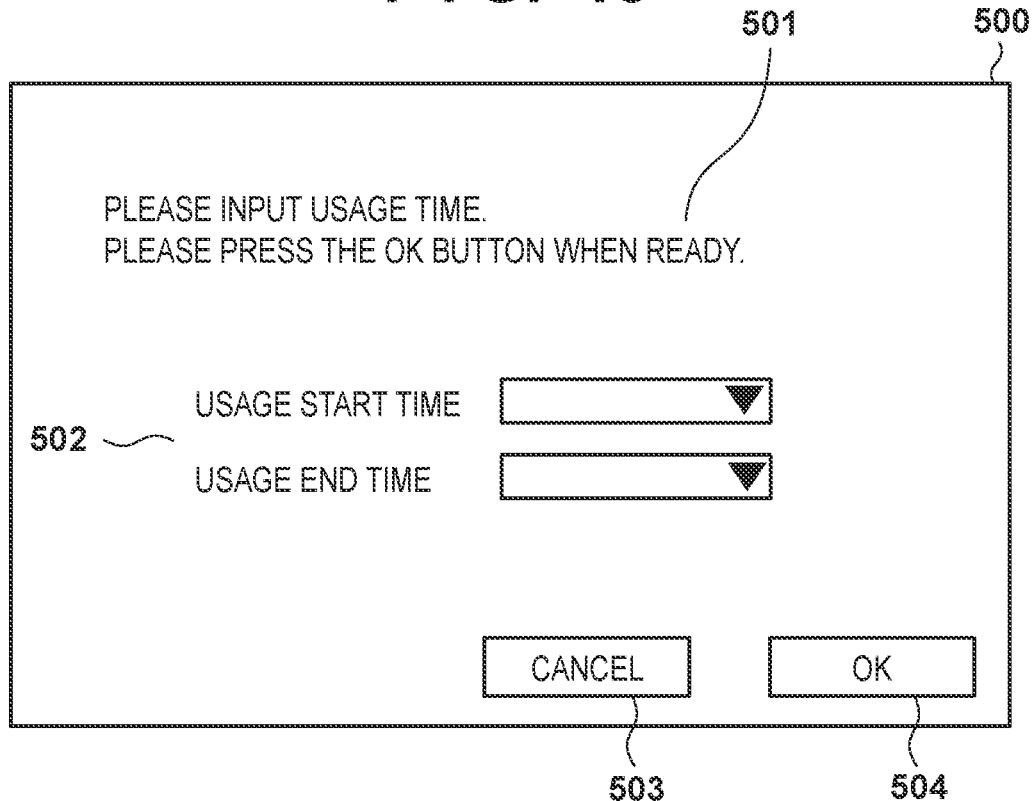

CONTROL APPARATUS, CONTROL METHOD, AND STORAGE MEDIUM STORING PROGRAM

CROSS-REFERENCE TO RELATED APPLICATION(S)

This application claims priority to and the benefit of Japanese Patent Application No. 2019-064026 filed on Mar. 28, 2019, the entire disclosure of which is incorporated herein by reference.

BACKGROUND OF THE INVENTION

Field of the Invention

The present invention relates to a control apparatus, a control method, and a storage medium storing a program, according to which it is possible to generate a travel route of a vehicle.

Description of the Related Art

In recent years, a route generation system that uses biological information of a passenger of a vehicle has been known. Japanese Patent Laid-Open No. 2014-235078 discloses that a fatigue level of a driver is determined and a route is generated according to the determination result.

However, taking into consideration not only the fatigue level but also various factors for generating the route is essential for improving convenience for passengers.

SUMMARY OF THE INVENTION

The present invention provides a control apparatus that performs route generation based on multiple different factors, a control method, and a storage medium storing a program.

The present invention in its first aspect provides a control apparatus according to the present invention includes: a first information acquisition circuit configured to acquire a recognition result relating to a passenger of a vehicle; a second information acquisition circuit configured to acquire information relating to a surrounding environment of the vehicle; and a vehicle control circuit configured to generate a travel route of the vehicle based on the recognition result acquired by the first information acquisition circuit and the information relating to the surrounding environment acquired by the second information acquisition circuit, in which the information relating to the surrounding environment includes information relating to a route set according to the recognition result.

The present invention in its second aspect provides a control method according to the present invention is a control method to be executed by a control apparatus, the control method including: acquiring a recognition result relating to a passenger of a vehicle; acquiring information relating to a surrounding environment of the vehicle; and generating a travel route of the vehicle based on the acquired recognition result and the acquired information relating to the surrounding environment, in which the information relating to the surrounding environment includes information relating to a route set according to the recognition result.

The present invention in its third aspect provides a storage medium storing a program according to the present invention is a computer-readable storage medium storing a program for causing a computer to function so as to: acquire a recognition result relating to a passenger of a vehicle; acquire information relating to a surrounding environment of the vehicle; and generate a travel route of the vehicle based on the acquired recognition result and the acquired information relating to the surrounding environment, in which the information relating to the surrounding environment includes information relating to a route set according to the recognition result.

According to the present invention, it is possible to perform route generation based on multiple different factors.

BRIEF DESCRIPTION OF THE DRAWINGS

FIG. 12 is a diagram showing a user interface screen.
FIG. 13 is a diagram showing a user interface screen.

DESCRIPTION OF THE EMBODIMENTS

Figure 1A:
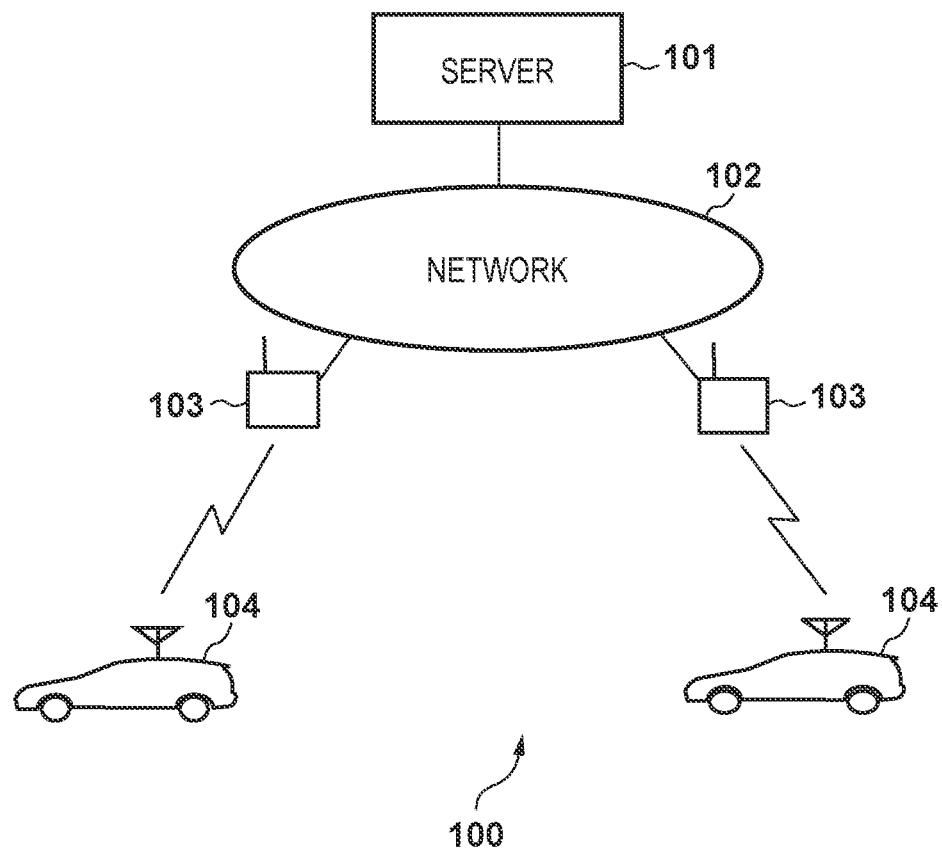
FIGS. 1A and 1B are diagrams showing a configuration of a route generation system.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1A is a diagram showing a configuration of a space provision system 100 according to the present embodiment. As shown in FIG. 1A, the space provision system 100 includes a server 101, base stations 103, and vehicles 104. The server 101 is a server that can provide a space provision service of the present embodiment to the vehicles 104, and provides a space provision service to the vehicles 104. The vehicles 104 can communicate with the server 101 via the network 102, and receive the space provision service from the server 101.

The base stations 103 are base stations provided in a region in which, for example, the server 101 can provide the space provision service, and can mutually communicate with the vehicles 104. Also, the server 101 is configured to be able to mutually communicate with the base stations 103 via the network 102, which is wired, wireless, or both. With this configuration, for example, the vehicles 104 can transmit vehicle information such as GPS position information to the server 101, and the server 101 can transmit navigation screen data and the like to the vehicles 104. Also, the server 101 and the vehicle 104 can connect to a network other than the network 102 shown in FIG. 1A, and for example, can connect to the Internet. Also, the server 101 acquires Web search results and SNS information of a pre-registered user (corresponds to a passenger of the vehicle 104) and can acquire a search trend and the like (preferences) of that user.

The space provision system 100 may include configurations other than those shown in FIG. 1A, and for example, a roadside device provided on the side of a road may also be connected to the network 102. This roadside device can perform inter-vehicle communication with vehicles 104 using, for example, DSRC (Dedicated Short Range Communication), and is used to transfer vehicle information of the vehicles 104 to the server 101 in some cases, and is used to transmit state information of the road surface (cracks, etc.) to the server 101 in some cases.

In FIG. 1A, only one server 101 is shown, but the server 101 may also be constituted by multiple apparatuses. Also, in FIG. 1A, only two vehicles 104 are shown, but there is no particular limitation to the number shown in the drawing, as long as the server 101 can provide the space provision service.

Figure 1B:
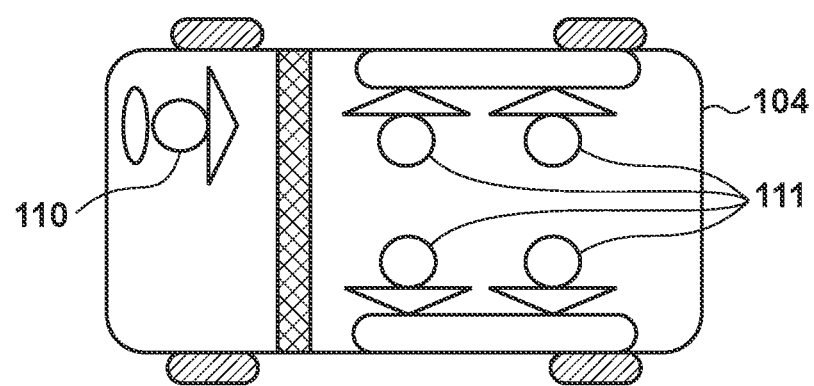

FIG. 1B is a diagram showing a state of passengers in a vehicle 104. As shown in FIG. 1B, in the vehicle 104, a staff member 110 is in the driver seat, and passengers 111 (four people in the drawing) are in the backseat. Here, the passengers 111 receive the space provision service and the staff member 110 does not. In the present embodiment, the passengers 111 board the vehicle 104, which has stopped at a predetermined location inside of a provision area of the space provision service of the server 101. There is no limitation to a purpose of heading to some destination, and for example, the four passengers 111 are looking for a location at which to have a meeting. The space provision service of the present embodiment can provide, for example, an in-vehicle space of the vehicle 104 to the four people as a space for having a meeting. The four people can use the vehicle interior of the vehicle 104 for a meeting (a so-called business purpose) for a predetermined amount of time upon boarding the vehicle 104 as passengers 111. Also, the vehicle 104 travels for that predetermined amount of time along a route that has been set. In the present embodiment, the route setting is set automatically and not through an operation performed by a passenger 111. For example, if the passengers 111 are to use the vehicle interior space of the vehicle 104 for business, a route that avoids crowds is set, and if the vehicle interior space is to be used for chatting over drinks, a route that makes a trip around a sightseeing area or the like is set.

Essentially, the staff member 110 is not involved with the passengers 111 in the backseat, but waits in the driver seat in order to perform manual operation of the vehicle 104 during an emergency. Also, the staff member 110 performs an operation corresponding to the state of the automatic driving control of the vehicle 104. For example, when the steering wheel needs to be gripped due to the travel route of the vehicle 104, the staff member 110 grips the steering wheel. Also, when the staff member 110 has an obligation to monitor the surrounding environment of the driver or an obligation to monitor the vehicle system, the staff member 110 monitors them. Also, the staff member 110 performs takeover when there is a request to take over driving from the vehicle travel system. Thus, by causing the staff member 110 to wait, it is possible to provide the passengers 111 with a sense of security. Also, the staff member 110 may be one of the passengers 111. That is, the vehicle 104 may take the form of a vehicle that is used in a car sharing service.

Figure 2:
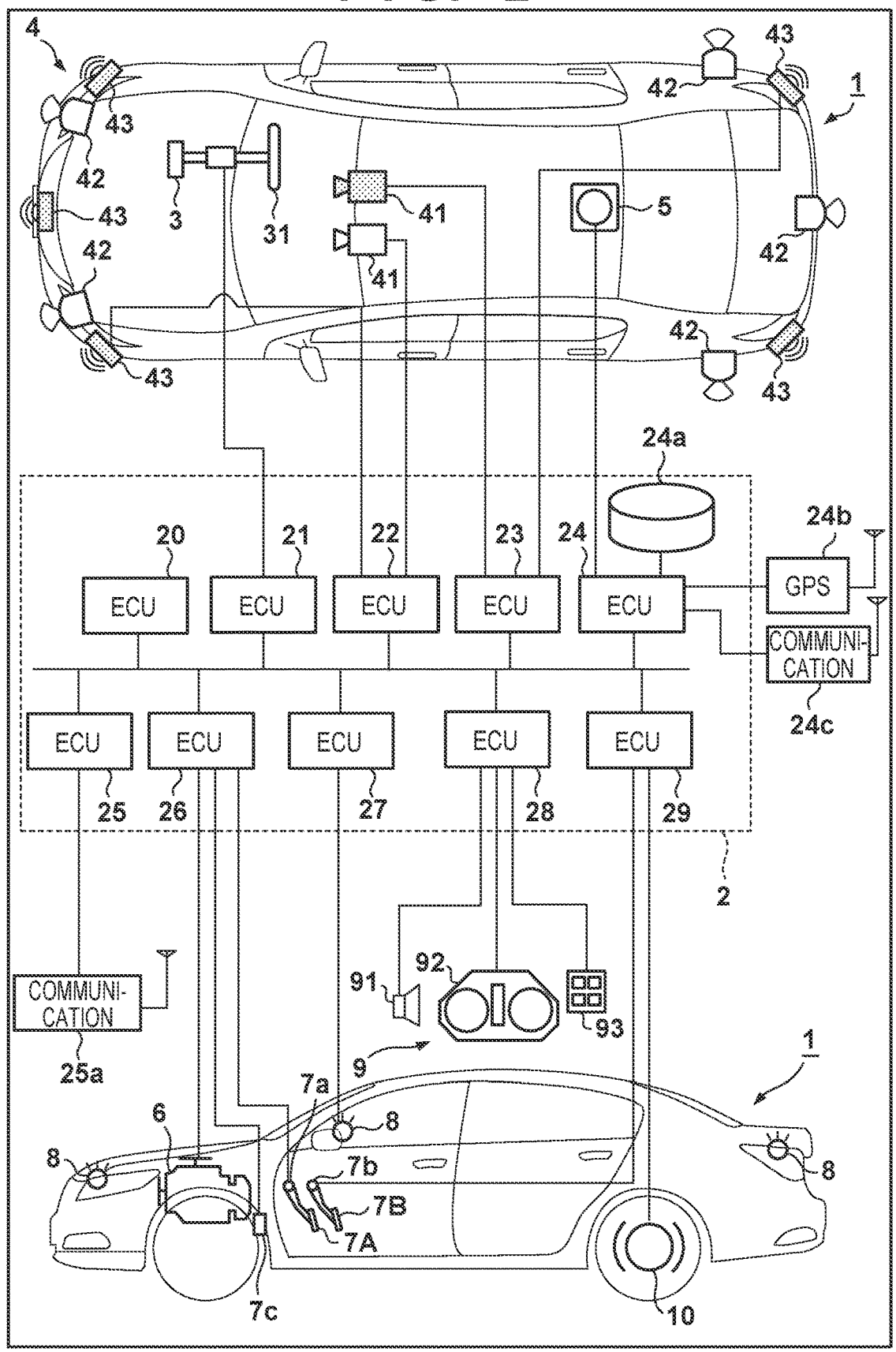
FIG. 2 is a diagram showing a configuration of a vehicle control apparatus.

FIG. 2 is a block diagram of a vehicle control apparatus (travel control apparatus) according to an embodiment of the present invention, which controls a vehicle 1. The vehicle 1 of FIG. 2 corresponds to the vehicles 104 in FIGS. 1A and 1B. In FIG. 2, the vehicle 1 is shown overall by a plan view and a side view. The vehicle 1 is a sedan-type four-wheel passenger vehicle in one example.

The travel control apparatus of FIG. 2 includes a control unit 2. The control unit 2 includes multiple ECUs 20 to 29 that are connected through an in-vehicle network so as to be able to communicate with each other. Each ECU includes a processor represented by a CPU, a storage device such as a semiconductor memory, an interface with an external device, and the like. Programs executed by the processor, data used by the processor for processing, and the like are stored in the storage device. Each ECU may also include multiple storage devices, interfaces, and the like.

Hereinafter, functions and the like that are handled by the ECUs 20 to 29 will be described. Note that the number of ECUs and the functions handled thereby can be designed as appropriate, and can be set at a finer or broader level than that described in the present embodiment.

The ECU 20 executes control relating to automatic driving of the vehicle 1. In the automatic driving, at least one of steering and acceleration of the vehicle 1 is automatically controlled.

The ECU 21 controls an electric power steering apparatus 3. The electric power steering apparatus 3 includes a mechanism that steers the front wheels according to a driving operation (steering operation) performed by the driver on a steering wheel 31. Also, the electric power steering apparatus 3 includes a motor that exhibits a driving force for assisting a steering operation or automatically steering the front wheels, a sensor for detecting the steering angle, and the like. When the driving state of the vehicle 1 is automatic driving, the ECU 21 automatically controls the electric power steering apparatus 3 and controls the travel direction of the vehicle 1 in correspondence with an instruction from the ECU 20.

The ECUs 22 and 23 perform control of detection units 41 to 43 that detect the state of the surrounding area of the vehicle, and perform information processing of the detection results. The detection units 41 are cameras for capturing images frontward of the vehicle 1 (hereinafter referred to as "cameras 41" in some cases), and in the case of the present embodiment, the detection units 41 are attached on the vehicle interior side of a front window on the front portion of a roof of the vehicle 1. For example, extraction of an outline of an object and extraction of demarcation lines (white lines, etc.) of the lanes of the road can be performed through analysis of images captured by the cameras 41.

The detection units 42 are Light Detection and Ranging (LIDAR), detect objects in the surrounding area of the vehicle 1, and measure the distances to the objects. In the case of the present embodiment, five detection units 42 are provided, one at each corner of the front portion of the vehicle 1, one at the center of the rear portion, and one on each side of the rear portion. The detection units 43 are millimeter-wave radars (hereinafter denoted as "radars 43" in some cases), detect objects in the surrounding area of the vehicle 1, and measure distances to the objects. In the case of the present embodiment, five radars 43 are provided, one in the center of the front portion of the vehicle 1, one at each corner of the front portion, and one on each side of the rear portion.

The ECU 22 performs control of one camera 41 and the detection units 42 and performs information processing of the detection results. The ECU 23 performs control of the other camera 41 and the radars 43 and performs information processing of the detection results. By including two sets of apparatuses for detecting the state of the surrounding area of the vehicle, it is possible to improve the reliability of the detection results, and by including different types of detection units such as cameras and radars, it is possible to perform multifaceted analysis of the surrounding environment of the vehicle.

The ECU 24 performs control of a gyrosensor 5, a GPS sensor 24b, and a communication apparatus 24c, and performs information processing of the detection results or the communication results. The gyrosensor 5 detects rotary motion of the vehicle 1. The advancement of the vehicle 1 can be determined according to the detection results of the gyrosensor 5, the wheel speeds, and the like. The GPS sensor 24b detects the current location of the vehicle 1. The communication apparatus 24c performs wireless communication with a server that provides map information, traffic information, and weather information, and acquires these pieces of information. The ECU 24 can access a database 24a of map information constructed in a storage device, and the ECU 24 searches for a route from a current location to a destination, and the like. Note that a database for the above-described traffic information, weather information, and the like may also be constructed in the database 24a.

The ECU 25 includes a communication apparatus 25a for inter-vehicle communication. The communication apparatus 25a performs wireless communication with other vehicles in the surrounding area, and performs information exchange between vehicles. The communication apparatus 25a includes various communication functions, and for example, includes a dedicated short-range communication (DSRC) function and a cellular communication function. The communication apparatus 25a may also be constituted as a TCU (Telematics Communication Unit) that includes a transmission/reception antenna.

The ECU 26 controls a power plant 6. The power plant 6 is a mechanism that outputs a driving force for rotating the drive wheels of the vehicle 1, and for example, includes an engine and a transmission. The ECU 26 controls the output of the engine in correspondence with a driving operation (an accelerator operation or an acceleration operation) of a driver detected by an operation detection sensor 7a provided on an accelerator pedal 7A, and switches the gear ratio of the transmission based on information such as the vehicle speed detected by a vehicle speed sensor 7c. When the driving state of the vehicle 1 is automatic driving, the ECU 26 automatically controls the power plant 6 and controls the acceleration of the vehicle 1 in correspondence with an instruction from the ECU 20.

The ECU 27 controls lighting devices (headlights, taillights, etc.) including direction indication devices 8 (blinkers). In the case of the example shown in FIG. 2, the direction indication devices 8 are provided on the front portion, the door mirrors, and the rear portion of the vehicle 1.

The ECU 28 performs control of an input/output apparatus 9. The input/output apparatus 9 performs output of information to the driver, and performs reception of input of information from the driver. An audio output apparatus 91 reports information through audio to the driver. A display apparatus 92 reports information through display of an image to the driver. The display apparatus 92 is arranged in front of the driver seat, for example, and constitutes an instrument panel and the like. Note that although audio and display are given as examples here, information may also be reported through vibration or light. Information may also be reported through a combination of any of audio, display, vibration, and light. Furthermore, the combination may also be changed or the reporting mode may also be changed according to the level (e.g., degree of urgency) of the information to be reported. The display apparatus 92 may also include a navigation apparatus.

The input apparatus 93 is a group of switches that are arranged at a position that can be operated by the driver and perform instructions to the vehicle 1, and may also include an audio input apparatus such as a microphone.

The ECU 29 controls a brake apparatus 10 and a parking brake (not shown). The brake apparatus 10 is, for example, a disc brake apparatus, is provided for each wheel of the vehicle 1, and decelerates or stops the vehicle 1 by adding resistance to the rotation of the wheels. For example, the ECU 29 controls the operation of the brake apparatuses 10 in correspondence with a driving operation (brake operation) of a driver, which is detected by the operation detection sensor 7b provided on the brake pedal 7B. When the driving state of the vehicle 1 is automatic driving, the ECU 29 automatically controls the brake apparatus 10 and controls deceleration and stopping of the vehicle 1 in correspondence with instructions from the ECU 20. The brake apparatus 10 and the parking brake can be operated in order to maintain the stopped state of the vehicle 1. Also, when the transmission of the power plant 6 includes a parking lock mechanism, the parking lock mechanism can be operated in order to maintain the stopped state of the vehicle 1.

Control relating to automatic driving of the vehicle 1, which is executed by the ECU 20, will be described. When a destination and automatic driving are instructed by the driver, the ECU 20 automatically controls the travel of the vehicle 1 toward the destination in accordance with a guiding route searched for by the ECU 24. During automatic control, the ECU 20 acquires information relating to the state of the surrounding area of the vehicle 1 (external environment information) from the ECUs 22 and 23, performs recognition, and controls the steering and acceleration of the vehicle 1 by giving instructions to the ECU 21 and the ECUs 26 and 29 based on the acquired information and the recognition results.

Figure 3:
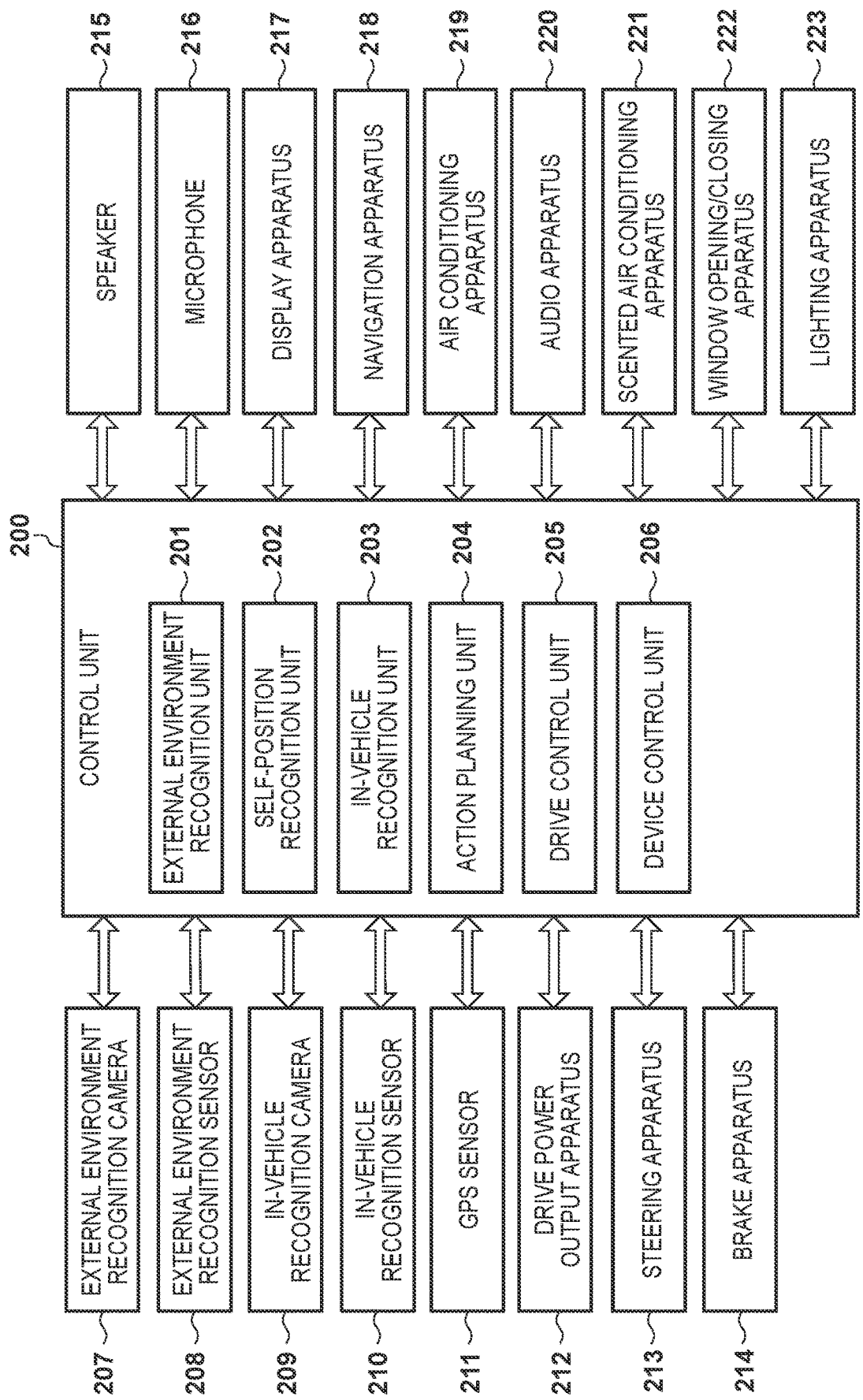
FIG. 3 is a diagram showing functional blocks of a control unit.

FIG. 3 is a diagram showing functional blocks of the control unit 2. The control unit 200 corresponds to the control unit 2 of FIG. 2, and includes an external environment recognition unit 201, a self-position recognition unit 202, an intra-vehicle recognition unit 203, an action planning unit 204, a drive control unit 205, and a device control unit 206. Each block is realized by one or multiple ECUs shown in FIG. 2.

The external environment recognition unit 201 recognizes the external environment information of the vehicle 1 based on signals from an external environment recognition camera 207 and an external environment recognition sensor 208. Here, the external environment recognition camera 207 is, for example, the camera 41 shown in FIG. 2, and the external environment recognition sensor 208 is, for example, the detection units 42 and 43 shown in FIG. 2. The external environment recognition unit 201 recognizes, for example, scenes such as intersections, railroad crossings, and tunnels, free spaces such as a road shoulder, and behavior of other vehicles (speed, travel direction, etc.) based on signals from the external environment recognition camera 207 and the external environment recognition sensor 208. A self-position recognition unit 202 recognizes the current position of the vehicle 1 based on a signal from the GPS sensor 211. Here, the GPS sensor 211 corresponds to, for example, the GPS sensor 24b shown in FIG. 2.

The in-vehicle recognition unit 203 identifies passengers of the vehicle 1 and recognizes the state of the passengers based on signals from an in-vehicle recognition camera 209 and an in-vehicle recognition sensor 210. The in-vehicle recognition camera 209 is, for example, a near-infrared camera that is installed on the display apparatus 92 inside of the vehicle 1, and for example, detects the direction of the line of sight of a passenger based on the captured image data. Also, for example, the in-vehicle recognition sensor 210 is a sensor for detecting a biological signal of a passenger and acquiring biological data. Biological information is, for example, information relating to the body, such as a pulse rate, pulse count, body weight, body temperature, blood pressure, sweating, and sleep information. The in-vehicle recognition sensor 210 may also acquire the information relating to the body from, for example, a wearable device of the passenger. The in-vehicle recognition unit 203 recognizes a sleeping state of the passenger and a working state other than driving based on these signals.

The action planning unit 204 plans an action of the vehicle 1, such as an optimal route or a risk-avoidance route, based on the result of the recognition performed by the external environment recognition unit 201 and the self-position recognition unit 202. For example, the action planning unit 204 performs approach determination based on a start point and an end point such as an intersection or a railroad cross, and action planning based on the result of predicting the behavior of another vehicle. The drive control unit 205 controls a drive power output apparatus 212, a steering apparatus 213, and a brake apparatus 214 based on the action planning performed by the action planning unit 204. Here, for example, the drive power output apparatus 212 corresponds to the power plant 6 shown in FIG. 2, the steering apparatus 213 corresponds to the electric power steering apparatus 3 shown in FIG. 2, and the brake apparatus 214 corresponds to the brake apparatus 10.

The device control unit 206 controls devices that are connected to the control unit 200. For example, the device control unit 206 controls the speaker 215 and the microphone 216, causes predetermined audio messages such as messages for warning and navigation to be output, detects an audio signal resulting from a passenger in the vehicle speaking, and acquires audio data. For example, the device control unit 206 controls the display apparatus 217 to cause display of a predetermined interface screen. The display apparatus 217 corresponds to, for example, the display apparatus 92. Also, the display apparatus 217 includes not only the form of a display or the like, but also the form of a projector that projects onto a wall surface in the vehicle. Also, for example, the device control unit 206 controls the navigation apparatus 218 and acquires the setting information in the navigation apparatus 218.

The device control unit 206 controls an air conditioning apparatus 219 and adjusts the temperature in the vehicle. Also, the device control unit 206 controls an audio apparatus 220 and reproduces music or the like via a speaker 215. Also, the device control unit 206 controls a scented air conditioning apparatus 221 and produces a scented space in the vehicle. Also, the device control unit 206 controls a window opening/closing apparatus 222 and controls the opening and closing of windows. Here, the window opening/closing apparatus 222 includes not only a window but also blinds, and is controlled by the device control unit 206. Also, the device control unit 206 controls a lighting apparatus 223 and adjusts the brightness in the vehicle. Also, the device control unit 206 controls mechanisms such as the reclining angle of a seat of a passenger 111.

The control unit 200 may also include functional blocks other than those shown in FIG. 3 as needed, and for example, may also include an optimal route calculation unit that calculates an optimal route to a destination based on the map information acquired via the communication apparatus 24c. The control unit 200 may also acquire information from a source other than the camera and the sensor shown in FIG. 3, and for example, the control unit 200 may also acquire information of other vehicles via the communication apparatus 25a. Also, the control unit 200 receives detection information from not only the GPS sensor 211, but from various sensors provided in the vehicle 1. For example, via an ECU included in a door portion, the control unit 200 receives detection signals from a door opening/closing sensor and a mechanism sensor of a door lock provided in the door portion of the vehicle 1. Accordingly, the control unit 200 can detect unlocking of the door and an opening/closing operation of the door.

Figure 4:
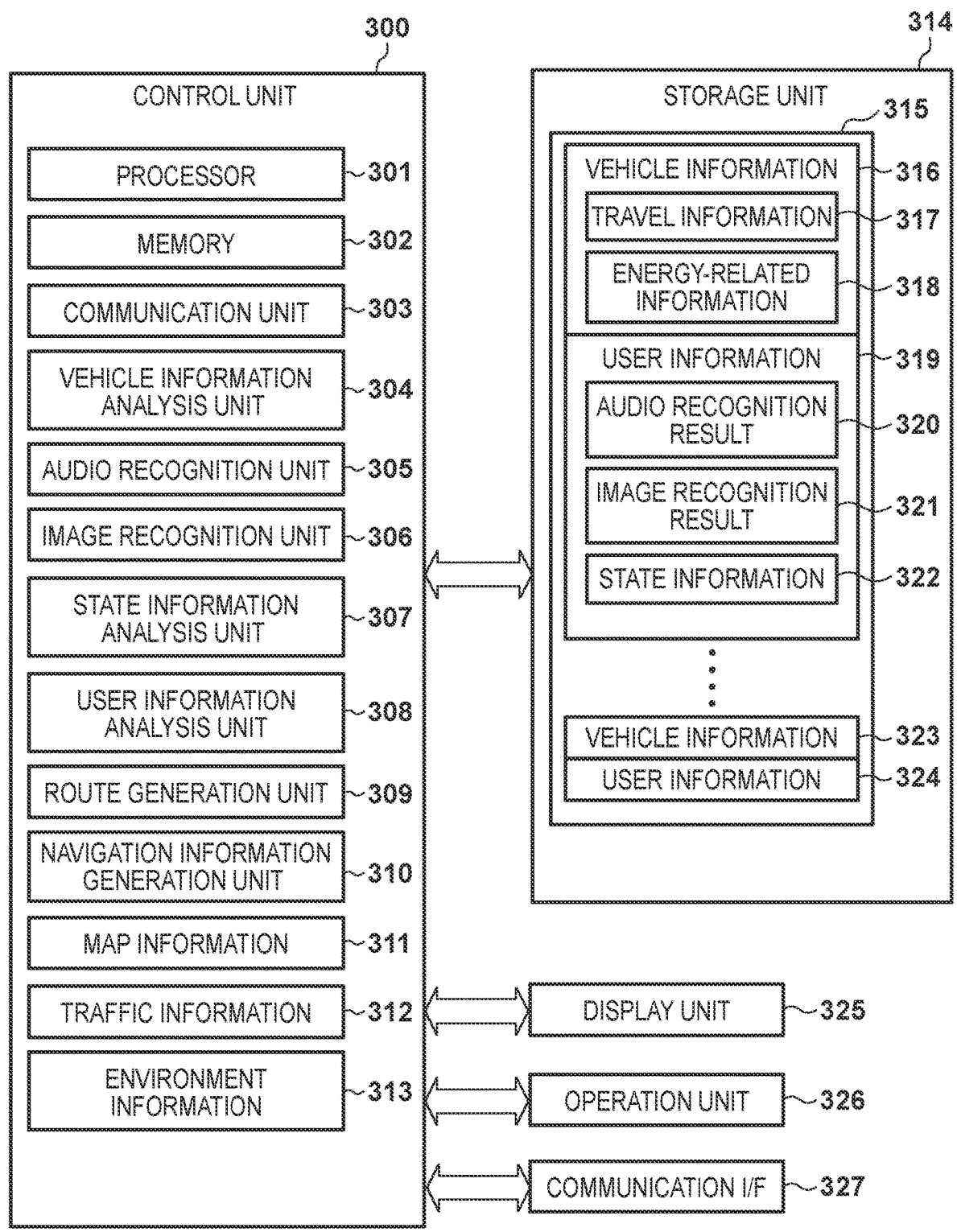
FIG. 4 is a diagram showing a configuration of a server.

FIG. 4 is a diagram showing a block configuration of the server 101. The control unit 300 is a controller that includes a CPU or a GPU and a memory such as a ROM or a RAM, and performs overall control of the server 101. The server 101 can be a computer that executes the present invention. Also, in the present embodiment, at least a portion of the configuration of the server 101 that can be an example of a control apparatus, or the configuration of the server 101 may also be included in the vehicle 104. That is, the configuration serving as the control apparatus may also be included inside of the vehicle 104, may be included outside of the vehicle 104, and may be dispersed both outside and inside of the vehicle 104, with the portions cooperating with each other. For example, the processor 301 serving as the CPU realizes the operations of the present embodiment by loading a control program stored in the ROM to the RAM and executing it. For example, the blocks in the control unit 300 may also include a GPU. For example, the display unit 325 is a display that displays various types of user interface screens. For example, the operation unit 326 is a keyboard or a pointing device and receives a user operation. The communication interface (I/F) 327 is an interface that enables communication with the network 102. For example, the server 101 can acquire various types of data that will be described later from the vehicle 104 via the communication I/F 327.

The processor 301 performs overall control of the blocks in the control unit 300 by, for example, executing a program stored in the memory 302. For example, the processor 301 performs control so as to receive the following various types of data from the vehicle 104 and after acquisition, the processor 301 instructs the corresponds blocks to analyze the data. The communication unit 303 controls communication with the exterior. The exterior includes not only the network 102 but also other networks. For example, the communication unit 303 can also communicate with a vehicle 104 or another apparatus connected to the network 102, or another server connected to another network, such as the Internet or a mobile phone system.

A vehicle information analysis unit 304 acquires vehicle information from the vehicle 104, such as GPS position information and speed information, and analyzes the behavior. An audio recognition unit 305 performs audio recognition processing based on audio data obtained by converting an audio signal resulting from a passenger of the vehicle 104 speaking, and transmitting the converted audio signal. For example, the audio recognition unit 305 classifies words spoken by a passenger of the vehicle 104 into emotions such as joy, anger, grief, and pleasure, and stores the classification results as an audio recognition result 320 (audio information) of user information 319 in association with the analysis results (position of the vehicle 104, time, etc.) obtained by the vehicle information analysis unit 304. In the present embodiment, "passenger" is assumed to include the passengers 111 of the vehicle 104. The image recognition unit 306 performs image recognition processing based on the image data captured in the vehicle 104. Here, "images" include still images and moving images. For example, the image recognition unit 306 recognizes a smile based on a face image of a passenger of the vehicle 104 and stores the recognition result as an image recognition result 321 (image information) of the user information 319 in association with the analysis results (position of the vehicle 104, time, etc.) obtained by the vehicle information analysis unit 304.

The state information analysis unit 307 analyzes the state information of the passenger of the vehicle 104. Here, the state information includes biological information such as the pulse rate, pulse count, and body weight. Also, the state information includes information regarding times at which the passenger of the vehicle 104 eats or drinks, and times at which the passenger goes to the bathroom. For example, the state information analysis unit 307 stores information relating to sleep of a passenger of the vehicle 104 as the state information 322 of the user information 319 in association with the analysis result (position of the vehicle 104, time, etc.) obtained by the vehicle information analysis unit 304. Also, for example, the state information analysis unit 307 performs various types of analysis on the state information 322, and for example, can detect whether a movement such as turning over accompanies sleep or no movement accompanies sleep (a deep sleep state).

The user information analysis unit 308 performs various types of analysis on the user information 319 stored in the storage unit 314. For example, based on the audio recognition result 320 and the image recognition result 321 of the user information 319, the user information analysis unit 308 obtains information spoken by passengers about the vicinity of the travel route of the vehicle 104 (e.g., a beachside roadway) or a location visited by the vehicle 104 (a destination, waypoint, etc.) and analyzes the emotions of the passengers based on the tone and tempo of the conversation, the expressions of the passengers, and the like. Also, for example, the user information analysis unit 308 analyzes the preference (trends in taste) of a user, such as being satisfied with a location that was visited or traveled in, based on the content spoken by the passengers about the vicinity of the travel route of the vehicle 104 or the location visited by the vehicle 104, and the emotion acquired based on the audio recognition result 320 and the image recognition result 321 at that time. The analysis result obtained by the user information analysis unit 308 is stored as the user information 319, and for example, is used for selecting a destination and for learning after the end of the space provision service.

The route generation unit 309 generates a route for the travel of the vehicle 104. The navigation information generation unit 310 generates navigation display data for displaying on a navigation apparatus 218 of the vehicle 104 based on the route generated by the route generation unit 309. For example, the route generation unit 309 generates a route from the current location to a destination based on the destination acquired from the vehicle 104. In the present embodiment, for example, when input of a destination is received by the navigation apparatus 218 at the departure location, for example, a route that passes through a sight-seeing destination is generated based on information reflecting the preference of a passenger of the vehicle 104, or information relating to a passenger.

The map information 311 is information on a road network, a facility relating to a road, and the like, and for example, a map database that is used in the navigation function or the like may also be used thereas. The traffic information 312 is information relating to traffic, and for example, is congestion information and traffic regulation information resulting from construction, events, and the like. Environment information 313 is information relating to the environment, and for example, is weather information (temperature, humidity, weather, wind speed, visibility information resulting from dense fog, rain, snow, and the like, disaster information, etc.). The environment information 313 also includes the population density of each region, and attribute information relating to facilities and the like. The map information 311, the traffic information 312, and the environment information 313 may, for example, be acquired from another server connected to the network 102.

The storage unit 314 is a storage region for storing programs and data that are needed in order for the server 101 to operate. Also, the storage unit 314 forms a database 315 based on the vehicle information acquired from the vehicle 104 and the user information acquired from the passenger of the vehicle 104.

The database 315 is a database in which the information relating to the vehicle 104 and the information relating to the passenger of the vehicle 104 are stored as a set. That is, in the space provision system 100, when a certain vehicle 104 travels from a departure location to a destination, the information relating to the vehicle 104 and the information relating to the passenger of the vehicle 104 are stored as a set in the database 315. That is, the database 315 includes multiple sets, such as a set of the vehicle information 316 and the user information 319 for a certain vehicle 104, and a set of the vehicle information 323 and the user information 324 for another vehicle 104. Also, even when the same passenger travels in the vehicle 104 on a different date, separate sets of information are stored.

The vehicle information 316 includes travel information 317 and energy-related information 318. For example, the travel information 317 is GPS position information, speed information, and route information of the vehicle 104, and the energy-related information 318 is the remaining amount of fuel and a vehicle-mounted battery remaining amount of the vehicle 104. The user information 319 includes the above-described audio recognition result 320, the image recognition result 321, and the state information 322. Also, the analysis result obtained by the user information analysis unit 308 is stored as the user information 319. The vehicle information 316 and the user information 319 are updated as needed while the vehicle 104 travels from the departure location to the destination. Even after the end of the space provision service, the vehicle information 316 and the user information 319 are stored in the database 315 and are used for learning performed by the user information analysis unit 308.

For example, after the end of the space provision service, the user information analysis unit 308 learns the trends in the times at which the passenger of the vehicle 104 eats or drinks, and the trends in the frequency and interval with which the passenger goes to the bathroom based on the vehicle information 316 and the user information 319 stored in the database 315. Then, for example, during the next instance of execution of the space provision service, the route generation unit 309 generates a route using the learning result. For example, if it is learned that the frequency with which a passenger goes to the bathroom is comparatively high, during the next instance of providing the space provision service, the route generation unit 309 generates a route such that a rest area is passed through according to the amount of time it takes to travel the distance to the destination.

Figure 5:
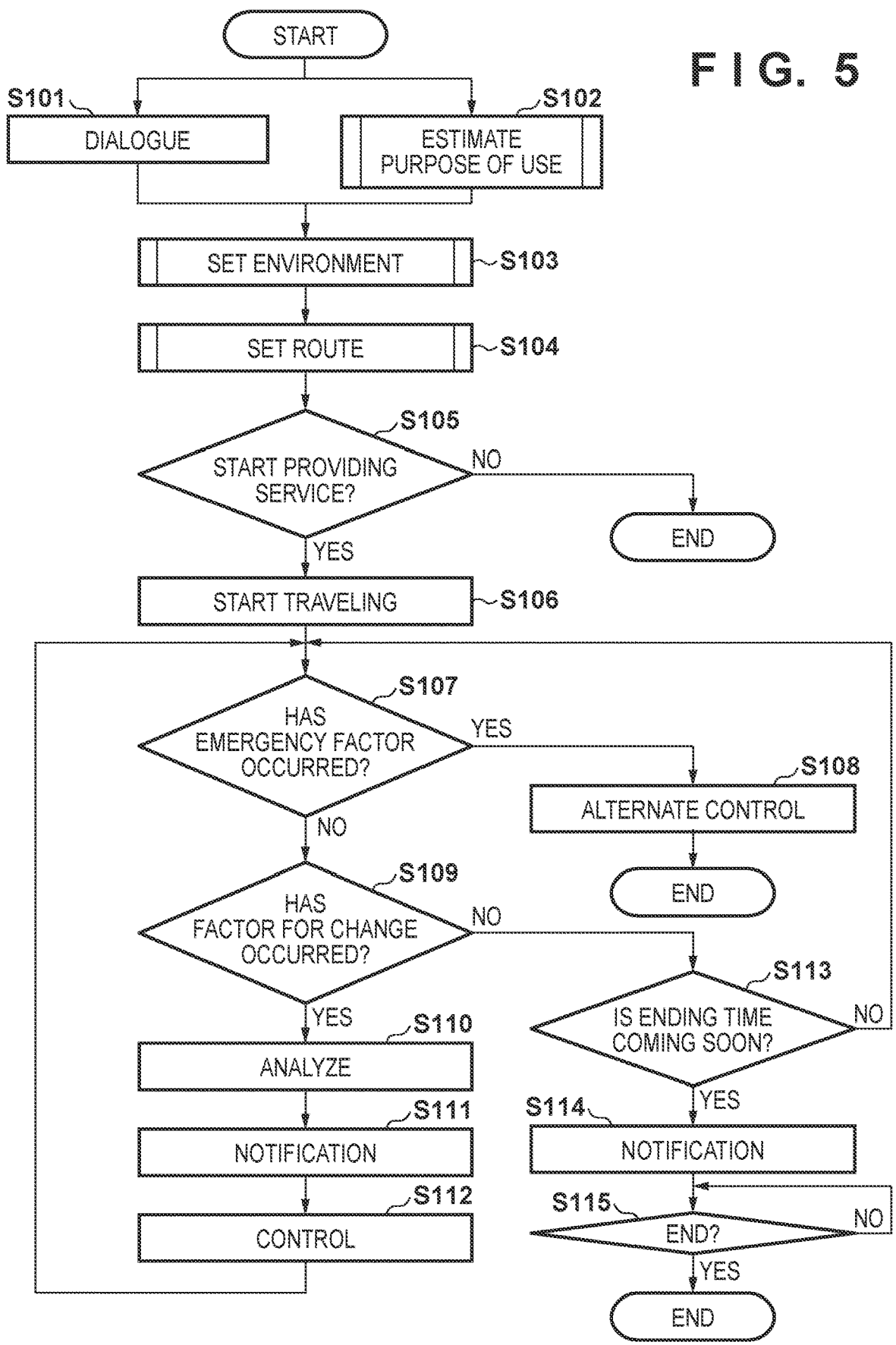
FIG. 5 is a flowchart showing processing of a route generation system.

FIG. 5 is a flowchart showing processing of a route generation system according to the present embodiment. The processing of FIG. 5 is realized by, for example, the processor 301 (e.g., the CPU) of the control unit 300 loading a program stored in the ROM to the RAM and executing it. Also, the processing of FIG. 5 is started, for example, when four people board the vehicle 104 as the passengers 111.

In step S101, upon recognizing that the passengers 111 have boarded the vehicle 104, the control unit 300 displays a start screen 400 such as that shown in FIG. 12 on the display apparatus 217 of the vehicle 104 or on a wall surface in the vehicle. The start screen 400 is a screen for notifying that the space provision service will be started, and a message such as "A comfortable space corresponding to your purpose will be provided. Please read the following contract, and if you agree, please press the Agree button." is displayed as a message 401.

In the present embodiment, when a passenger 111 boards the vehicle, the purpose for which the space provision service is to be used is estimated based on the appearance or conversation of the passengers. That is, since it takes time to execute image recognition processing and audio recognition processing of the passengers, in step S101, the control unit 300 performs a dialogue that starts from the start screen shown in FIG. 12 with the passengers 111. This dialogue may be a dialogue on a screen, an audio dialogue, or a combination thereof. Hereinafter, the dialogue will be described as a screen display.

FIG. 12 shows a state in which a contract 402 is displayed. The contract 402 is content that requires agreement in order to start the space provision service, such as a case of getting the vehicle interior dirty. If the passengers 111 agree to the content, the passengers 111 press an agree button 404. If the passengers 111 do not agree, the passengers 111 press a cancel button 403. If the cancel button 403 is pressed, the space provision service ends.

FIG. 13 is a diagram showing a screen that is displayed after the agree button 404 is pressed. A message saying "Please input usage time. Please press the OK button when ready." is displayed as a message 501 on the screen 500 shown in FIG. 13. The passenger 111 can input the usage start time and the usage end time in an item 502. When the OK button 504 is pressed, the next screen is displayed. Also, when the cancel button 503 is pressed, the input content in the screen 500 is cancelled. The screen that is displayed after the start screen 400 is not limited to the screen 500, and for example, it is also possible to display a screen that can receive input of information such as an ID and a password issued in advance by the server 101.

Figure 14:
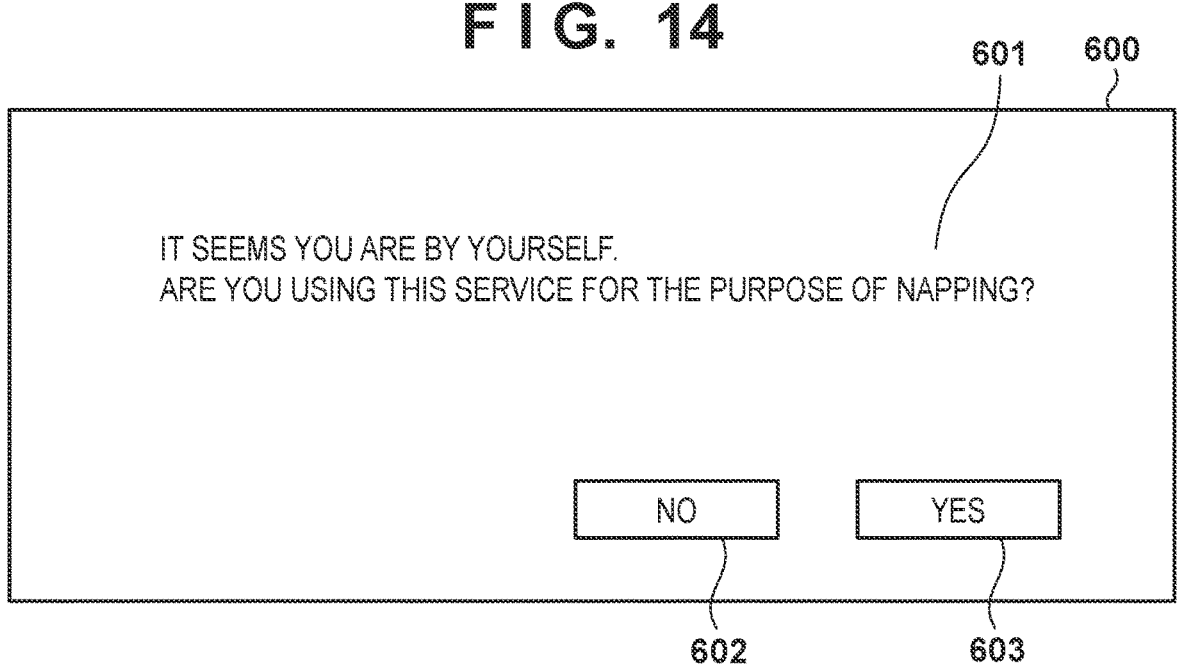
FIG. 14 is a diagram showing a user interface screen.

While the screens shown in FIGS. 12 and 13 are displayed and the dialogue with the passengers 111 is being performed, the control unit 300 uses the audio recognition unit 305 to perform audio recognition processing based on the audio data resulting from the passengers 111 speaking, and uses the image recognition unit 306 to perform image recognition processing based on the image data obtained by capturing images of the passengers 111. In view of this, for example, the control unit 300 performs recognition of the number, sex, and age group of the passengers 111. The sex and age group may be recognized based on face images, and may also be recognized from detection of items possessed or worn by the passengers 111. Also, the control unit 300 displays a screen shown in FIG. 14 when it is recognized based on the image recognition results that there is one passenger 111.

The message "It seems you are by yourself. Are you using this service for the purpose of napping?" is displayed as a message 601 on the screen 600 shown in FIG. 14. This is a dialogue for confirming that the purpose is napping. In the present embodiment, essentially, estimation of the purpose of use of the space provision service is performed without an operation performed by the passenger 111, but regarding purposes such as napping, which are difficult to estimate when the passenger 111 is boarding, confirmation is performed through a dialogue, as with the screen 600. The control unit 300 confirms whether or not the purpose is napping according to a press of the button 602 or 603.

Figure 6:
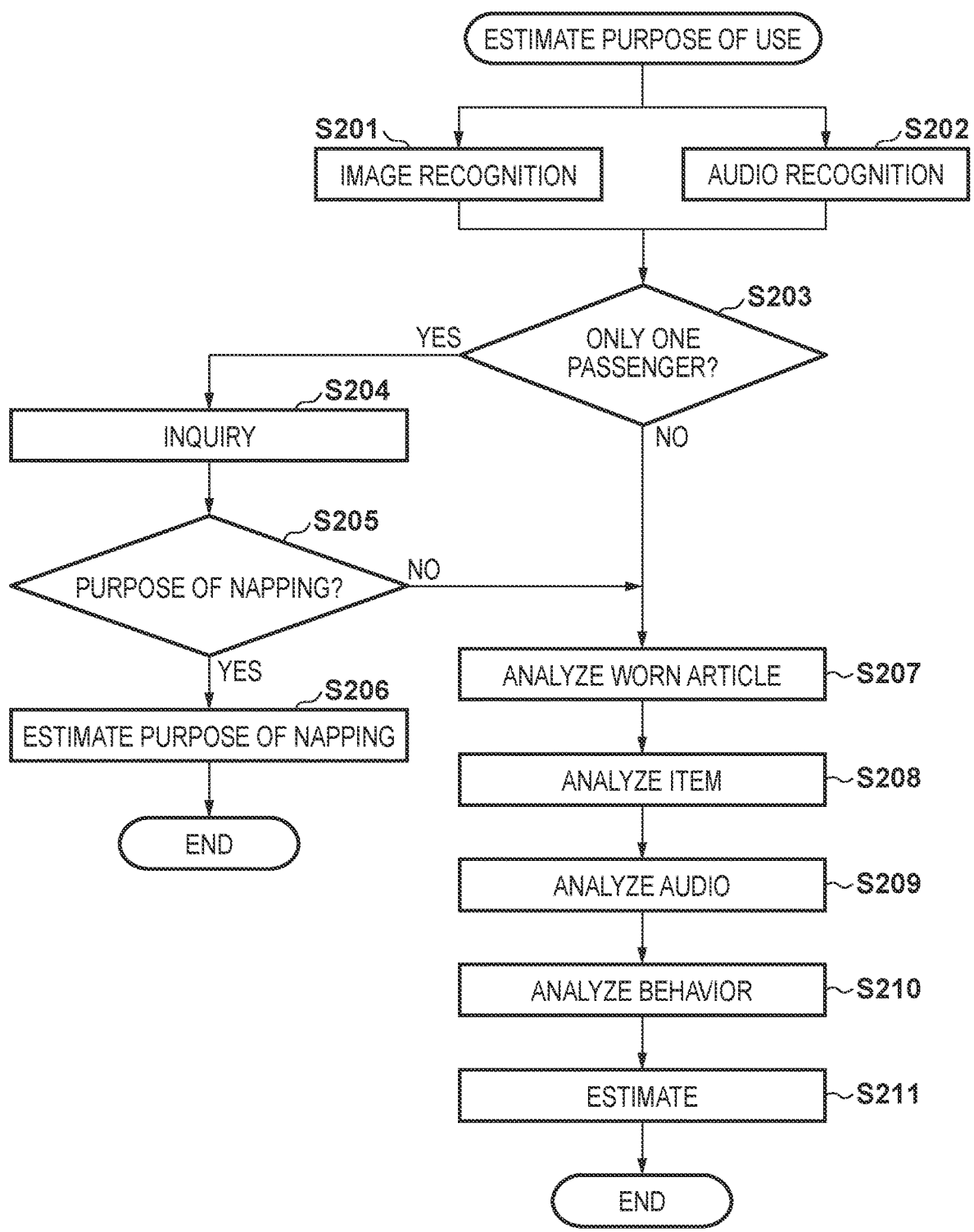
FIG. 6 is a flowchart showing processing for estimating a purpose of use.

FIG. 6 is a flowchart showing processing for estimating the purpose of use in step S102. In step S201, the control unit 300 uses the image recognition unit 306 to perform image recognition processing based on image data obtained by capturing an image of the passenger 111. Also, in step S202, the control unit 300 uses the audio recognition unit 305 to perform audio recognition processing based on the audio data resulting from the passenger 111 speaking.

In step S203, the control unit 300 determines whether or not there is only one passenger 111. Here, if it is determined that there is only one passenger, in step S204, the control unit 300 performs an inquiry to the passenger 111 in order to confirm that there is only one passenger. The inquiry in this context is, for example, display of the screen 600 shown in FIG. 14. For example, when a Yes button 603 is pressed on the screen 600, the processing advances to step S206, and the control unit 300 estimates the purpose of use of the space provision service to be the purpose of napping. On the other hand, if a No button 602 is pressed, the processing advances to step S207.

In step S207, the control unit 300 uses the image recognition unit 306 to perform image recognition processing based on the image data obtained by capturing an image of the passenger 111 and perform analysis of an article worn by the passenger 111. Analysis of the worn article is performed based on, for example, the color distribution and the shape, and for example, the analysis results are classified as a suit, a necktie, and business shoes (labeling).

In step S208, the control unit 300 uses the image recognition unit 306 to perform image recognition processing based on the image data obtained by capturing an image of the passenger 111 and perform analysis of an item of the passenger 111. The analysis of the items is performed based on, for example, the color distribution, a gloss determination, and the shape, and the analysis results are classified as, for example, jewelry and a laptop PC (labeling).

In step S209, the control unit 300 analyzes the audio of the passenger 111 based on the audio recognition result obtained by the audio recognition unit 305. For example, the prevalence of honorific and polite expressions in conversation between the passengers 111 is analyzed. The sentence endings of utterances spoken by the passengers 111 may also be analyzed.

In step S210, the control unit 300 analyzes the behavior of the passenger 111 based on the image recognition results obtained by the image recognition unit 306. For example, actions of the passengers 111 such as extending a hand and saying "After you" or bowing are detected.

In step S211, the control unit 300 performs estimation of the purpose of use of the passengers 111 based on the analysis results of steps S207 to S210. For example, a case in which use of the service is estimated to be for the purpose of business is as follows. When predetermined worn articles such as suits, business casual (jackets, shirts, slacks, and neckties), and leather shoes are detected as a result of the worn article analysis of step S207, use of the service is estimated to be for the purpose of business. Also, when predetermined items such as business bags, attaché cases, laptop PCs, and ID cards close to the chest are detected as a result of the item analysis of step S208, use of the service is estimated to be for the purpose of business. Also, when it is recognized that the prevalence of honorific and polite expressions is high as a result of the audio analysis of step S209, use of the service is estimated to be for the purpose of business. Also, when it is recognized as a result of the behavior analysis performed in step S210 that the prevalence of actions such as bowing is high, use of the service is estimated to be for the purpose of business.

For example, a case in which use of the service is estimated to be for the purpose of chatting is as follows. When predetermined worn articles such as plain clothes and casual shoes are detected as a result of the worn article analysis performed in step S207, use of the service is estimated to be for the purpose of chatting. Also, when a predetermined item such as a backpack, a bag other than a business bag, or an alcoholic drink is detected as a result of the item analysis performed in step S208, use of the service is estimated to be for the purpose of chatting. Use of the service may also be estimated to be for the purpose of chatting when no item is detected. Also, when a predetermined feature amount, or for example, when an utterance (drawing out the end of a sentence) and an action (putting an arm around a shoulder) that have feature amounts and are exchanged between people who are close with each other, are recognized as a result of the audio analysis and image analysis of step S209, use of the service is estimated to be for the purpose of chatting.

A priority level may also be provided in the above-described estimation. For example, if a priority level is set such that the purpose of business>the purpose of chatting, and no factor for the purpose of business is recognized in the analysis results, use of the service may be estimated to be for the purpose of chatting. This is because it is thought that in worn articles, items, audio, and behavior, factors for the purpose of business have less variation in feature amounts than factors for the purpose of chatting, and thus it is easier to estimate the feature amounts thereof. Also, estimation may also be performed by combining the analysis results of steps S207 to S210 and other factors. For example, even if it is estimated based on the analysis results of steps S207 to S210 that use of the service is for the purpose of business, if the current time information is a predetermined time span such as 18:00 or later, use of the service may be estimated to be for the purpose of chatting. Also, if a word from which the purpose can be clearly interpreted is detected as a result of the audio analysis performed in step S209, estimation may be performed with that analysis result given the highest degree of priority. It is also possible to perform not only estimation of the purposes, but also to estimate information added to the purposes. For example, the "purpose of entertainment for foreigners" may also be estimated as a result of image recognition performed on skin, hair, eye color, and items such as backpacks.

As described above, in the present embodiment, there are three types of estimation of the purpose of use, namely business, chatting, and napping, but there is no limitation to these, and it is also possible to estimate another purpose such as a party, or a specific event (Halloween, etc.). For example, the control unit 300 learns parameters of a neural network in advance such that it is possible to perform classification of predetermined worn articles and items according to the purpose that is estimated.

FIG. 5 will be referred to once again. In step S103, the control unit 300 performs environment settings inside of the vehicle 104.

Figure 7:
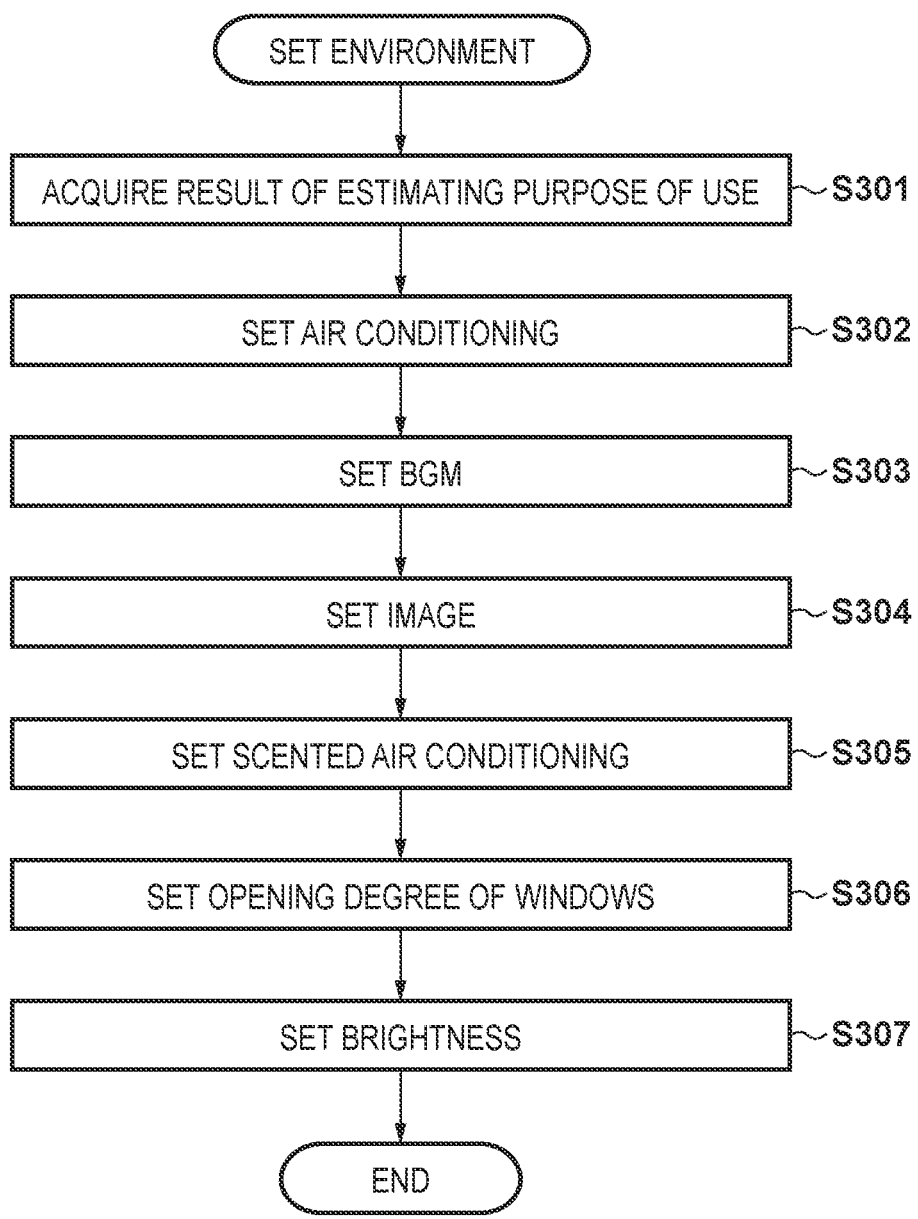
FIG. 7 is a flowchart showing processing for environment setting.

FIG. 7 is a flowchart showing processing for environmental settings performed in step S103. In step S301, the control unit 300 acquires the result of estimating the purpose of use. Then, through the following processing, the control unit 300 sets the environment in the vehicle 104.

In step S302, the control unit 300 sets the air conditioning inside of the vehicle 104 and transmits the setting data to the control unit 200 of the vehicle 104. For example, if the result of estimating the purpose of use is that use of the service is for the purpose of business, for example, the air conditioning is set to 22° C. in summer and to 25° C. in winter, according to the environment information. For example, if the result of estimating the purpose of use is that use of the service is for the purpose of chatting, the air conditioning is set to 28° C. in summer and to 20° C. in winter. For example, if the result of estimating the purpose of use is that use of the service is for the purpose of napping, the air conditioning is set 1 to 2° C. lower than in the case of chatting. Also, the parameter of the air conditioning is not limited to the above-described temperature, and it is also possible to set another parameter such as humidity thereas. The control unit 200 of the vehicle 104 uses the device control unit 206 to control the air conditioning apparatus 219 based on the received setting data.

In step S303, the control unit 300 sets BGM that is to play inside of the vehicle 104 and the volume of the BGM, and transmits the setting data to the control unit 200 of the vehicle 104. For example, if the result of estimating the purpose of use is that use of the service is for the purpose of chatting, the BGM is selected according to a commonly-known ranking or the like. For example, if the result of estimating the purpose of use is that use of the service is for the purpose of business, BGM for work is set. For example, if the result of estimating the purpose of use is that use of the service is for the purpose of napping, BGM for relaxation is set. Also, the volume may be changed according to the purpose of use, and for example, the volume may be set to the minimum in the case of napping. The control unit 200 of the vehicle 104 uses the device control unit 206 to control an audio apparatus based on the received setting data.

In step S304, the control unit 300 sets an image that is to be displayed inside of the vehicle 104 and transmits the setting data to the control unit 200 of the vehicle 104. For example, if the result of estimating the purpose of use is that use of the service is for the purpose of business, projection is performed such that the wall surface inside of the vehicle is made a monotone color tone. For example, if the result of estimating the purpose of use is that use of the service is for the purpose of chatting, the pattern projected on the wall surface in the vehicle changes accompanying the elapse of time. For example, in the case of napping, projection is performed such that the wall surface in the vehicle is a dark color tone. The image may also be changed according to the sex and age group of the passengers 111. For example, if the result of estimating the purpose of use is that use of the service is for the purpose of chatting and all of the passengers 111 are women, projection may be performed such that the wall surfaces look like woody wall surfaces of a café. The control unit 200 of the vehicle 104 uses the device control unit 206 to control a display apparatus 217 based on the received setting data.

In step S305, the control unit 300 sets scented air conditioning that is to be produced inside of the vehicle 104 and transmits the setting data to the control unit 200 of the vehicle 104. For example, if the result of estimating the purpose of use is that use of the service is for the purpose of chatting or napping, a scent with a high relaxation effect is emitted. For example, if the result of estimating the purpose of use is that use of the service is for the purpose of business, a scent with a high effect on concentration is emitted. The control unit 200 of the vehicle 104 uses the device control unit 206 to control a scented air conditioning apparatus 221 based on the received setting data.

In step S306, the control unit 300 sets the opening degree of the windows and blinds of the vehicle 104 and transmits the setting data to the control unit 200 of the vehicle 104. For example, if the result of estimating the purpose of use is that use of the service is for the purpose of business or napping, the windows are closed and the blinds are pulled down completely. For example, if the result of estimating the purpose of use is that use of the service is for the purpose of chatting, the blinds are raised completely. Control for opening the windows may also be performed according to environment information such as the weather. The control unit 200 of the vehicle 104 uses the device control unit 206 to control a window opening/closing apparatus 222 based on the received setting data.

In step S307, the control unit 300 sets the brightness inside of the vehicle 104 and transmits the setting data to the control unit 200 of the vehicle 104. For example, if the result of estimating the purpose of use is that use of the service is for the purpose of napping, the lighting may be set to be darker than that for the purpose of business or chatting. Also, in the case of napping, the user information 319 of the passenger 111 may also be adjusted such that the lighting is turned down smoothly based on, for example, the information relating to sleep (sleep depth, etc.) and the image recognition result. The control unit 200 of the vehicle 104 uses the device control unit 206 to control the lighting apparatus 223 based on the received setting data.

After step S307, the processing shown in FIG. 7 ends. Also, the processing of the environmental setting inside of the vehicle 104 is not limited to the processing of steps S302 to S307 and other processing may also be performed. Also, in steps S302 to S307, adjustment may be performed according to the environmental information. For example, in the image setting of step S304, if the travel route of the vehicle 104 is a route that passes through a famous sightseeing location, a description of the location and the like may also be displayed. In the BGM setting of step S303, the volume of the BGM may also be changed according to the travel route (a location with many/few people) of the vehicle 104 and the time span (daytime or nighttime).

FIG. 5 will be referred to once again. After the processing shown in FIG. 7, in step S104, the control unit 300 performs route setting in the vehicle 104.

Figure 8:
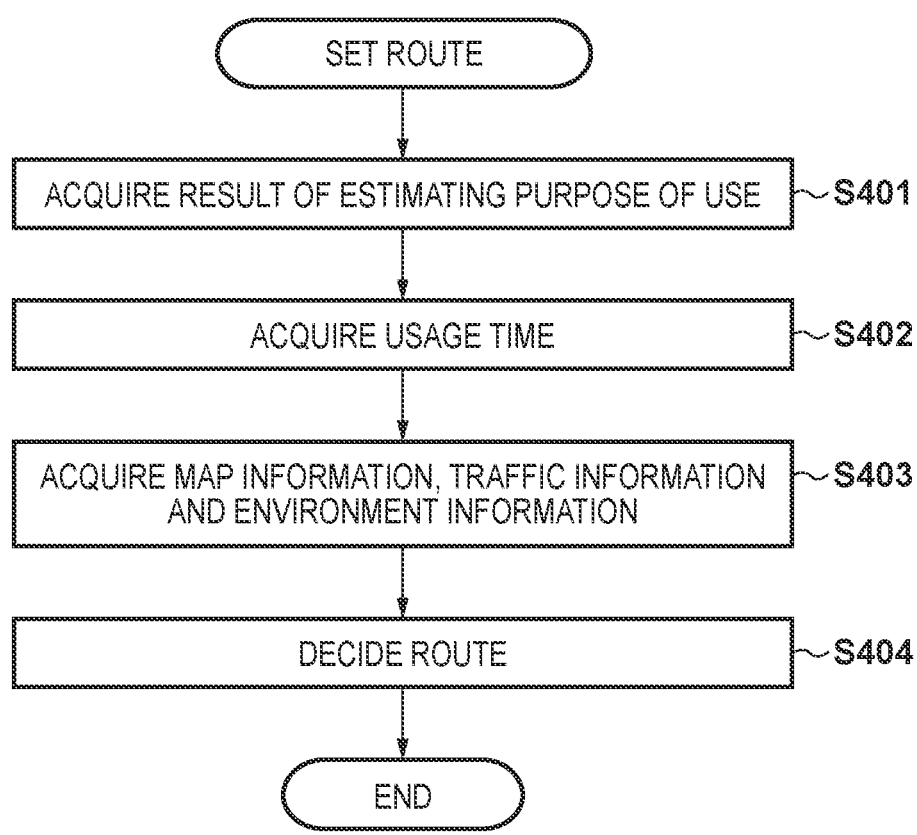
FIG. 8 is a flowchart showing processing for route setting.

FIG. 8 is a flowchart showing processing for route setting performed in step S104. In step S401, the control unit 300 acquires the result of estimating the purpose of use. In step S402, the control unit 300 acquires the usage time based on the usage start time and the usage end time. For example, the control unit 300 acquires the usage start time and the usage end time that were input in item 502 of the image 500.

In step S403, the control unit 300 acquires the map information, the traffic information, and the environment information from the map information 311, the traffic information 312, and the environment information 313 based on the result of estimating the purpose of use acquired in step S401 and the usage time acquired in step S402. In step S404, the control unit 300 decides on the travel route of the vehicle 104.

The control unit 300 searches for a route on which the vehicle 104 can travel based on the result of estimating the purpose of use and the usage time. In the case of business, it is thought that the passengers 111 will have few chances to look outside of the vehicle. That is, it is important not to hinder the work of the passengers 111 in the vehicle with vibration. Accordingly, in the case of this purpose, for example, first, the control unit 300 searches for a route that can be traveled on for the usage time and with the fuel remaining amount or the in-vehicle battery remaining amount of the vehicle 104. Then, when multiple routes are found, the control unit 300 selects with priority a route with relatively flat topography from among the multiple routes. In the case of napping, it is thought that the passenger 111 will have no chance at all to look outside of the vehicle. That is, it is important not to hinder the sleep of the passenger 111 in the vehicle with vibration, noise, and the like. Accordingly, in the case of this purpose, for example, first, the control unit 300 searches for a route that can be traveled on for the usage time and with the fuel remaining amount or the in-vehicle battery remaining amount of the vehicle 104. Then, when multiple routes are found, the control unit 300 selects with priority a route to which more conditions than in the case of business are added such that the external environment such as noise will not influence the interior, from among the multiple routes. For example, a route that is relatively flat and has a low population (e.g., a location located away from crowds (away from an urban location)) is chosen with priority. In the case of chatting, it is thought that the passengers 111 will have many chances to look outside of the vehicle. That is, it is important that the travel route is a route on which scenery and the like can be enjoyed. Accordingly, in the case of this purpose, for example, first, the control unit 300 searches for a route that can be traveled on for the usage time and with the fuel remaining amount or the in-vehicle battery remaining amount of the vehicle 104. Then, when multiple routes are found, the control unit 300 selects with priority a route that passes through many POIs (points of interest) corresponding to the purpose of use and the recognition results of the passenger 111 (e.g., being a foreigner, etc.), such as sight-seeing areas, from among the found routes.

Note that in the above description, it was described that a route that can be traveled on for the usage time and with the fuel remaining amount or the in-vehicle battery amount of the vehicle is searched for in the search for the route to be traveled on, but the target area for searching for a route may also be decided on as follows. For example, an area within a predetermined radius centered about the vehicle, a region, a prefecture, or an area within an urban area, such as a city in which the vehicle is located may also be used as the target area. Also, for example, the range that can be traveled based on the fuel remaining amount and the in-vehicle battery remaining amount mounted in the vehicle may also be set as the target area. Also, for example, if the vehicle is a share car, a possible travel region that it is predicted that the passenger can reach within a scheduled amount of time may also be set as the target area.

In the setting of the travel route, the image recognition result of step S201 shown in FIG. 6 and the audio recognition result of step S202 may also be used. For example, if the passenger 111 is recognized as a foreigner, a route that passes through many sight-seeing areas is selected. Also, in the setting of the travel route, it is also possible to change the degree of importance of the environment information. For example, in the case of business or napping, even if there is traffic congestion, it is thought that there will be little influence on the achievement of the purpose of use, but in the case of chatting, the influence of traffic congestion is thought to be relatively large. Accordingly, in the case of chatting, the degree of importance of traffic congestion information in the above-described selection of the route is made higher than in the cases of business and napping, and the route is set so as to avoid routes on which there is a high likelihood of traffic congestion. Also, if the result of estimating the purpose of use is that use of the service is for the purpose of business and if the usage time is long, such as 4 hours, for example, the route is set so as to go through a rest area every 1 hour 30 minutes.

Figure 15:
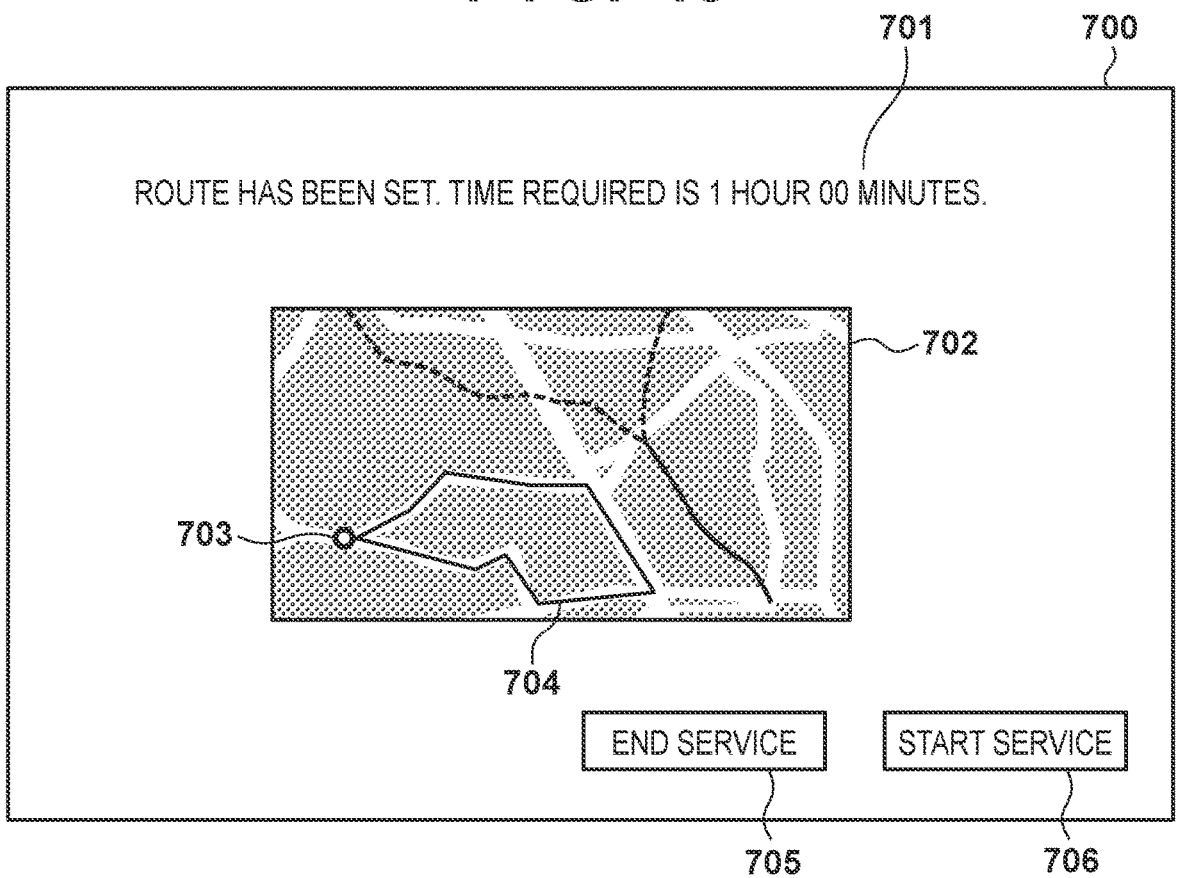
FIG. 15 is a diagram showing a user interface screen.

After setting the route, the control unit 300 transmits the screen data of the screen 700 shown in FIG. 15 to the control unit 200 of the vehicle 104. The control unit 200 of the vehicle 104 uses the device control unit 206 to cause display on the display apparatus 217 based on the received setting data. For example, a message 701 stating "Route has been set. Time required is 1 hour 00 minutes." is displayed on the screen 700. "1 hour 00 minutes" in this context corresponds to the usage time obtained from the content input in the item 502 of the screen 500 shown in FIG. 13. Also, a mark 703, which is the current position of the vehicle 104, and a route 704 set in FIG. 8 are displayed on a map 702. In the present embodiment, as with the route 704, a route that makes a tour and returns to the original position is set for the vehicle 104, but a destination may also be set. For example, in step S101, when the OK button 504 is pressed on the screen 500, a screen for setting the destination may also be displayed. When the button 706 is pressed, the space provision service is started, and when the button 705 is pressed, the space provision service ends.

After the processing of FIG. 8, in step S105 shown in FIG. 5, the control unit 300 determines whether or not to start providing the space provision service. For example, when the button 706 shown in FIG. 15 is pressed, the control unit 300 determines that provision of the space provision service is to be started, and the processing advances to step S106. On the other hand, for example, when the button 705 shown in FIG. 15 is pressed, it is determined that provision of the space provision service is not to be started, and the processing of FIG. 5 ends.

In step S106, the control unit 300 transmits a travel instruction for the vehicle along the travel route set in FIG. 8 to the control unit 200 of the vehicle 104. Then, the control unit 200 of the vehicle 104 performs control such that the travel of the vehicle 104 is started based on the received travel instruction.

In step S107, the control unit 300 determines whether or not an emergency factor has occurred. An emergency factor in this context is a factor according to which provision of the space provision service needs to be interrupted, and is, for example, the occurrence of an emergency such as a disaster. For example, if the occurrence of an earthquake or the like is recognized through communication from the vehicle 104 or through observation of the map information 311, the traffic information 312, and the environment information 313, the control unit 300 transmits an instruction to interrupt the space provision service to the control unit 200 of the vehicle 104. Then, in step S108, the control unit 200 of the vehicle 104 performs alternate control of the travel of the vehicle 104 based on the received cancellation instruction. As the alternate control, for example, the control unit 200 of the vehicle 104 requests the staff member 110 to take over driving. Alternatively, as the alternate control, the control unit 200 of the vehicle 104 controls the travel of the vehicle 104 so as to stop in a free space, such as a road shoulder. After step S108, the processing shown in FIG. 5 ends.

If it is determined in step S107 that no emergency factor has occurred, the processing proceeds to step S109, and the control unit 300 determines whether or not a factor for changing the environment inside of the vehicle 104 has occurred. Hereinafter, determination of the occurrence of a factor for environment change will be described.

Figure 9:
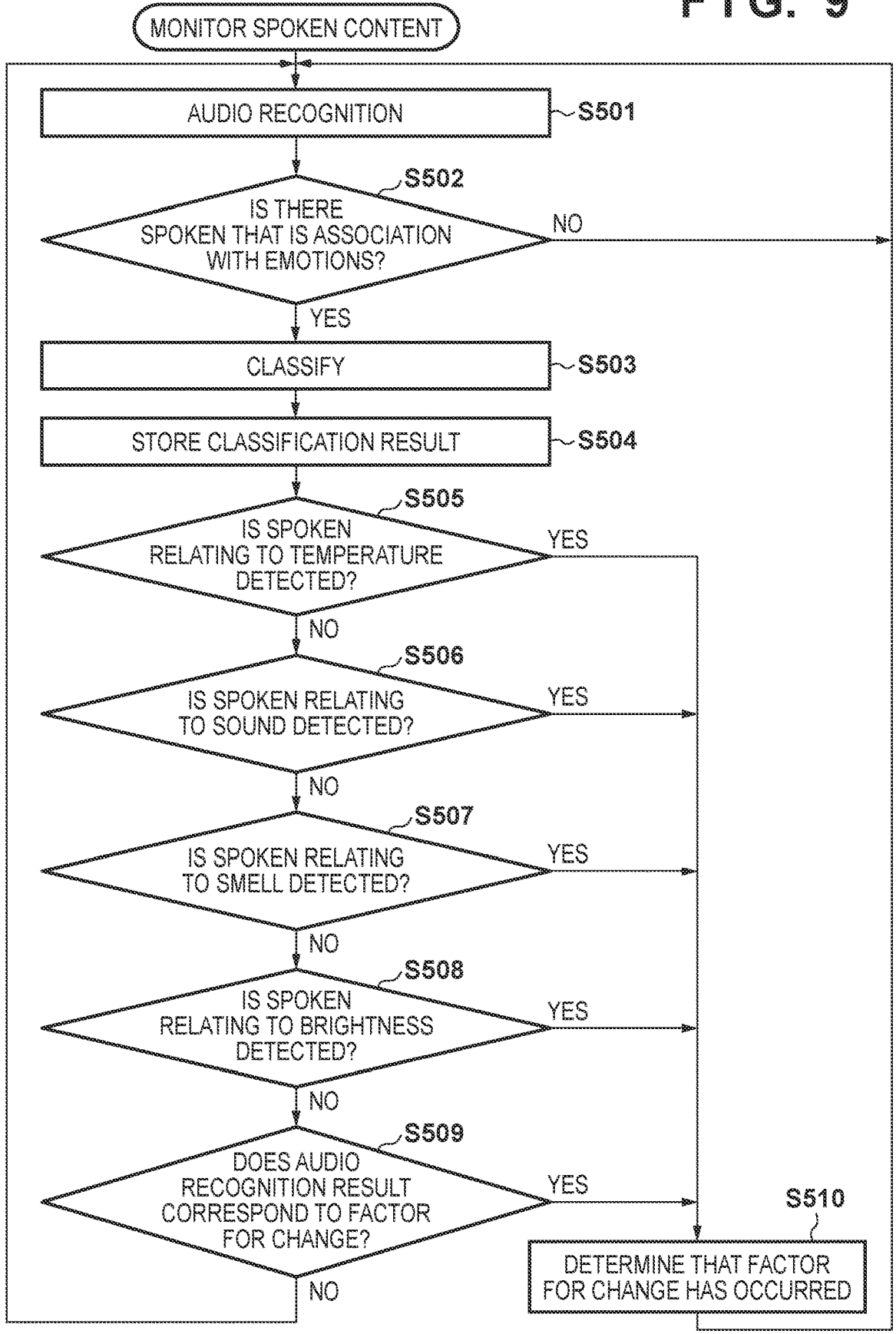
FIG. 9 is a flowchart showing processing for monitoring spoken content.
Figure 10:
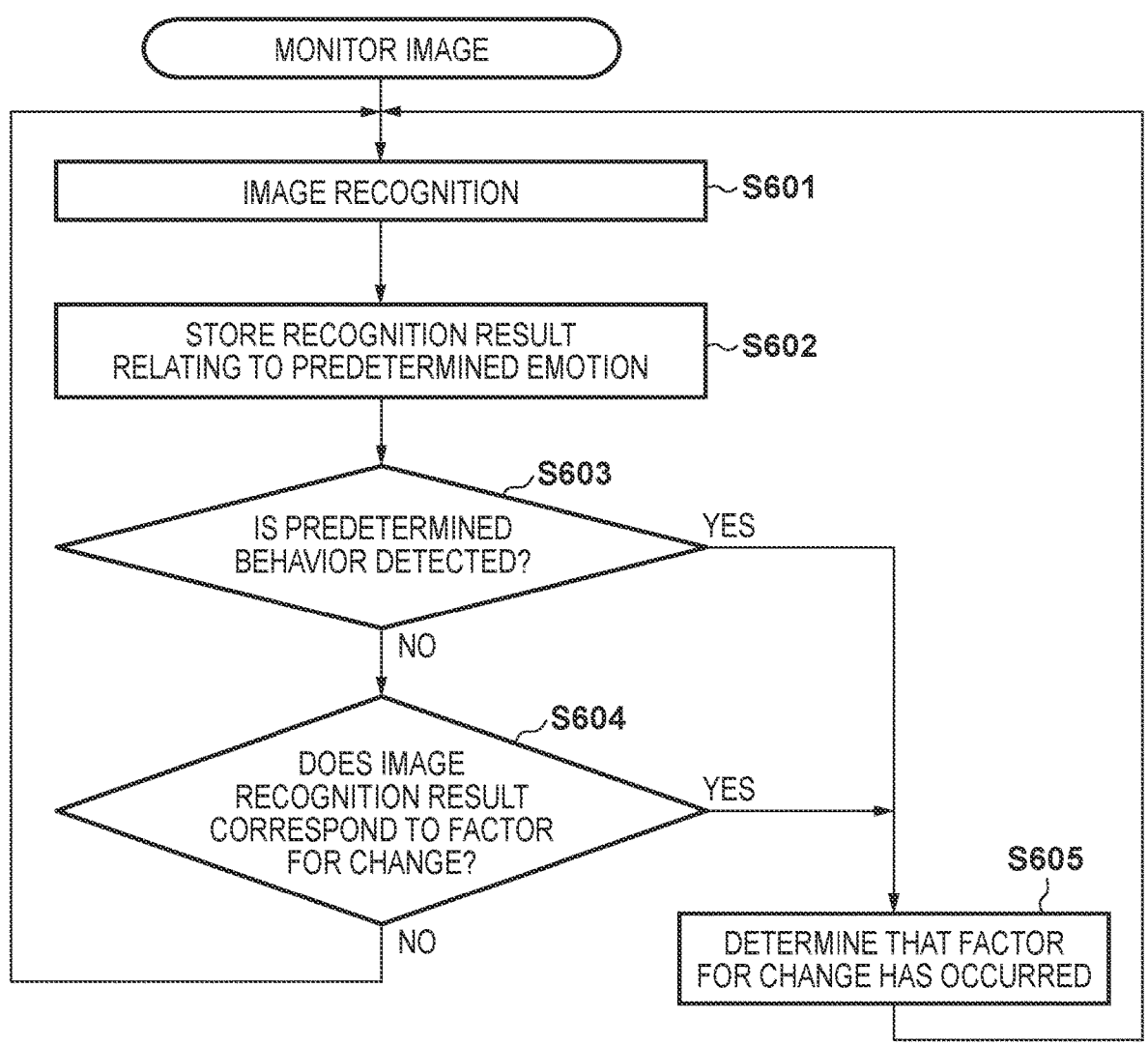
FIG. 10 is a flowchart showing processing for observing an in-vehicle image.
Figure 11:
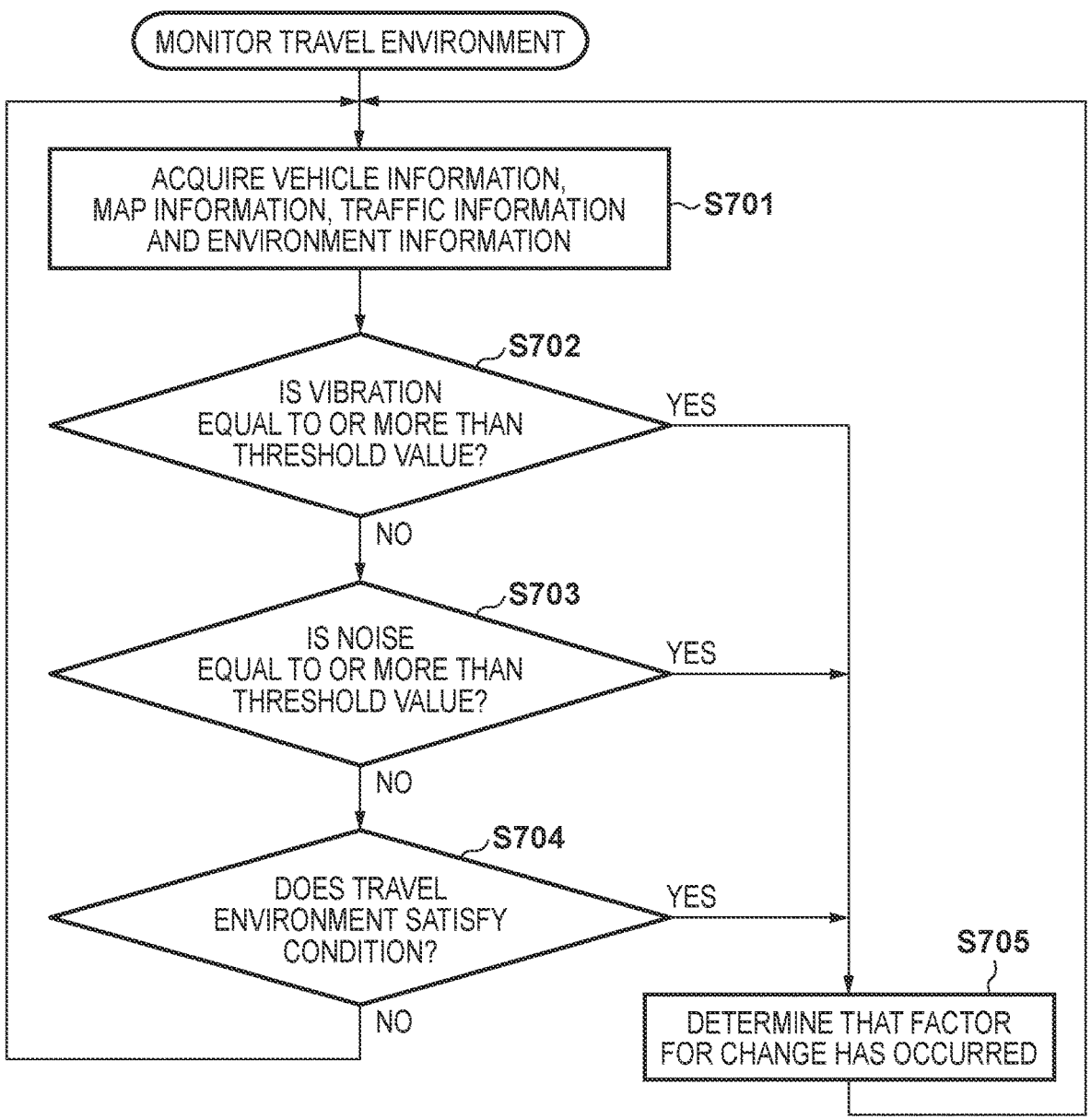
FIG. 11 is a flowchart showing processing for observing a travel environment.

FIGS. 9, 10, and 11 are flowcharts showing processing for determining whether or not a factor for environment change has occurred. FIGS. 9 to 11 are constantly performed while the vehicle 104 receives the space provision service, that is, while the vehicle 104 is traveling on the route 704. That is, in addition to vehicle information, for example, the vehicle 104 constantly transmits data obtained using the in-vehicle recognition camera 209, the in-vehicle recognition sensor 210, and the microphone 216 to the server 101, and the control unit 300 of the server 101 performs the processing of FIGS. 9 to 11 by analyzing these transmitted pieces of data.

FIG. 9 is a flowchart showing processing for monitoring of spoken content performed by the server 101. The processing of FIG. 9 is realized by, for example, the processor 301 (e.g., the CPU) of the control unit 300 loading a program stored in the ROM to the RAM and executing it.

In step S501, the control unit 300 uses the audio recognition unit 305 to perform audio recognition processing based on the audio data transmitted from the vehicle 104. In step S502, the control unit 300 determines whether or not there is, among the spoken content recognized through audio recognition processing, spoken content that is association with the emotions of joy, anger, grief, and pleasure. Spoken content associated with the emotions of joy, anger, grief, and pleasure is, for example, words (or phrases or sentences) such as "happy" and "sad", and when such words are recognized, it is determined that there is spoken content associated with emotions. On the other hand, if the spoken content is constituted by only location names and facts, for example, spoken content such as "This is lot number 1" or "Turn right", it is determined that there is no spoken content associated with emotions. If it is determined that there is spoken content associated with emotions, the processing advances to step S503, the control unit 300 classifies the spoken content into predetermined emotions, and in step S504, the control unit 300 stores the spoken content as the audio recognition results 320 of the user information 319 in the storage unit 314. At this time, the audio recognition result 320 is stored in association with the vehicle information, as, for example, "(position of vehicle 104=latitude X, longitude Y), (time=10:30), emotion type A (reference sign indicating the emotion of joy)". According to this configuration, emotion information of that passenger is stored in correspondence with the region traveled by the vehicle 104, and therefore, for example, it is possible to store the fact that the passenger was having fun when the vehicle 104 traveled on an oceanside road. If it was determined in step S502 that there is no spoken content associated with an emotion, the processing starting from step S501 is repeated.

In step S505, the control unit 300 determines whether or not spoken content relating to temperature was detected based on the spoken content recognized through audio recognition processing. Here, spoken content relating to temperature is, for example, words (or phrases or sentences) such as "hot" and "cold". If it is determined that spoken content relating to temperature has been detected, the processing advances to step S510, and the control unit 300 determines that a factor for environment change has occurred. In this case, it is determined in step S109 of FIG. 5 that a factor for environment change has occurred and the processing of step S110 is performed, whereas in FIG. 9, the processing starting from step S501 is repeated. If it is determined in step S505 that no spoken content relating to temperature has been detected, the processing advances to step S506.

In step S506, the control unit 300 determines whether or not spoken content relating to sound was detected based on the spoken content recognized through audio recognition processing. Here, spoken content relating to sound is, for example, words (or phrases or sentences) such as "noisy" or "quiet". If it is determined that spoken content relating to sound has been detected, the processing advances to step S510, and the control unit 300 determines that a factor for environment change has occurred. In this case, it is determined in step S109 of FIG. 5 that a factor for environment change has occurred and the processing of step S110 is performed, whereas in FIG. 9, the processing starting from step S501 is repeated. If it is determined in step S506 that no spoken content relating to sound has been detected, the processing advances to step S507.

In step S507, the control unit 300 determines whether or not spoken content relating to smell was detected based on the spoken content recognized through audio recognition processing. Here, spoken content relating to smell is, for example, words (or phrases or sentences) such as "Something smells weird". If it is determined that spoken content relating to smell has been detected, the processing advances to step S510, and the control unit 300 determines that a factor for environment change has occurred. In this case, it is determined in step S109 of FIG. 5 that a factor for environment change has occurred and the processing of step S110 is performed, whereas in FIG. 9, the processing starting from step S501 is repeated. If it is determined in step S507 that no spoken content relating to smell has been detected, the processing advances to step S508.

In step S508, the control unit 300 determines whether or not spoken content relating to brightness was detected based on the spoken content recognized through audio recognition processing. Here, spoken content relating to brightness is, for example, words (or phrases or sentences) such as "It's too bright" or "It's too dark". If it is determined that spoken content relating to brightness has been detected, the processing advances to step S510, and the control unit 300 determines that a factor for environment change has occurred. In this case, it is determined in step S109 of FIG. 5 that a factor for environment change has occurred and the processing of step S110 is performed, whereas in FIG. 9, the processing starting from step S501 is repeated. If it is determined in step S508 that no spoken content relating to brightness has been detected, the processing advances to step S509.

In step S509, the control unit 300 determines whether or not the audio recognition result corresponds to a factor for environment change. For example, if it is determined that the result of estimating the purpose of use is that use of the service is for the purpose of chatting, and that the conversation between the passengers has become lively due to the tone, volume, or tempo of the audio, the control unit 300 determines that a factor for environment change has occurred in order to adjust the temperature, sound, and brightness in the vehicle. Also, for example, if the control unit 300 detects words such as "I need to go to the bathroom", the control unit 300 determines that a factor for environment change has occurred. If it is determined that the audio recognition result corresponds to a factor for environment change, the processing advances to step S510, and the control unit 300 determines that a factor for environment change has occurred. In this case, it is determined in step S109 of FIG. 5 that a factor for environment change has occurred and the processing of step S110 is performed, whereas in FIG. 9, the processing starting from step S501 is repeated. If it is determined in step S509 that the audio recognition result does not correspond to a factor for environment change, the processing of step S501 is repeated.

FIG. 10 is a flowchart showing spoken content monitoring processing performed by the server 101. The processing shown in FIG. 10 is realized by, for example, the processor 301 (e.g., a CPU) of the control unit 300 loading a program stored in the ROM to the RAM and executing it.

In step S601, the control unit 300 uses the image recognition unit 305 to perform image recognition processing based on image data transmitted from the vehicle 104. In step S602, the control unit 300 stores, among the recognition results obtained through image recognition processing, recognition results associated with a predetermined emotion, as the image recognition results 321 of the user information 319 in the storage unit 314. At this time, the image recognition results 321 are stored in association with the vehicle information as, for example, "(position of vehicle 104=latitude X, longitude Y), (time=13:00), emotion category A (reference symbol indicating the emotion of joy)".

For example, in step S602, smile determination may also be performed. Since it is thought that sound is more recognizable than images in the classification of emotions such as joy, anger, grief, and pleasure, smile determination, which is thought to have a particularly high recognizability among the emotions, is performed in step S602. However, the image recognition result may also be classified into predetermined emotions.

In step S603, the control unit 300 determines whether or not a predetermined behavior has been detected as a result of the recognition performed through the image recognition processing. For example, if the control unit 300 detects behaviors such as fanning, wiping off sweat, and putting on a jacket, which are related to air conditioning settings, or if the control unit 300 detects behaviors such as squinting and frowning, which are related to brightness settings, the processing advances to step S605, and the control unit 300 detects that a factor for environment change has occurred. In this case, it is determined in step S109 of FIG. 5 that a factor for environment change has occurred and the processing of step S110 is performed, whereas in FIG. 10, the processing starting from step S601 is repeated. If it is determined in step S603 that no predetermined behavior has been detected, the processing advances to step S604.

In step S604, the control unit 300 determines whether or not the image recognition result corresponds to a factor for environment change. For example, if it is determined that the result of estimating the purpose of use is that use of the service is for the purpose of chatting, and if it is determined that the number of appearances of smiles has increased based on the face images of the passengers, the control unit 300 determines that a factor for environment change has occurred in order to adjust the temperature, sound, and brightness in the vehicle. If it is determined that the image recognition results correspond to a factor for environment change, the processing advances to step S605, and the control unit 300 determines that a factor for environment change has occurred. In this case, it is determined in step S109 of FIG. 5 that a factor for environment change has occurred and the processing of step S110 is performed, whereas in FIG. 10, the processing starting from step S601 is repeated. If it is determined in step S604 that the image recognition result does not correspond to a factor for environment change, the processing of step S601 is repeated.

FIG. 11 is a flowchart showing travel environment monitoring processing performed by the server 101. The processing shown in FIG. 11 is realized by, for example, the processor 301 (e.g., a CPU) of the control unit 300 loading a program stored in the ROM to the RAM and executing it.

In step S701, the control unit 300 acquires the vehicle information from the vehicle 104. For example, the vehicle information is GPS position information, speed information, and energy-related information, such as the fuel remaining amount and the in-vehicle battery remaining amount. Also, the control unit 300 acquires the traffic information based on the acquired vehicle information. For example, the control unit 300 acquires traffic congestion information around the position of the vehicle 104 from the traffic information 312. Also, the control unit 300 acquires environment information based on the acquired vehicle information. For example, the control unit 300 acquires information on sightseeing locations from the environment information 313.

In step S702, the control unit 300 determines whether or not the vibration level is a threshold value or more as a result of the analysis of the vehicle information performed by the vehicle information analysis unit 304. Here, vibration is, for example, vibration that occurs in the vehicle 104 according to the road surface state. If it is determined that the vibration level is a threshold value or more, the processing advances to step S705, and the control unit 300 determines that a factor for environment change has occurred. In this case, it is determined in step S109 of FIG. 5 that a factor for environment change has occurred and the processing of step S110 is performed, whereas in FIG. 11, the processing starting from step S701 is repeated. If it is determined in step S702 that the vibration level is a threshold value or more, the processing advances to step S703.

In step S703, the control unit 300 determines whether or not the noise level is a threshold value or more as a result of the analysis of the vehicle information performed by the vehicle information analysis unit 304. Here, the noise level is, for example, the sound of a construction site. If it is determined that the noise level is a threshold value or more, the processing advances to step S705, and the control unit 300 determines that a factor for environment change has occurred. In this case, it is determined in step S109 of FIG. 5 that a factor for environment change has occurred and the processing of step S110 is performed, whereas in FIG. 11, the processing starting from step S701 is repeated. If it is determined in step S703 that the noise level is not a threshold value or more, the processing advances to step S704.

In step S704, the control unit 300 determines whether or not the travel environment satisfies a condition. For example, if the vehicle 104 is travelling near a famous location, it is determined that a factor for environment change has occurred. If it is determined that the travel environment satisfies a condition, the processing advances to step S705, and the control unit 300 determines that a factor for environment change has occurred. In this case, it is determined in step S109 of FIG. 5 that a factor for environment change has occurred and the processing of step S110 is performed, whereas in FIG. 11, the processing starting from step S701 is repeated. If it is determined in step S704 that the travel environment does not satisfy a condition, the processing starting from step S701 is repeated.

FIG. 5 will be referred to once again. If it is determined in step S109 that a factor for environment change has occurred, the processing moves to step S110, and the control unit 300 analyzes the factor for environment change that occurred.

In the analysis of step S110, the control unit 300 decides on the control for resolving the factor for environment change that occurred, based on each of the determination results of FIGS. 9 to 11 or a combination thereof. Here, the control that is decided on includes control for changing the environment in the vehicle 104 and control of the travel of the vehicle 104.

For example, if an utterance relating to the temperature (e.g., "hot") is detected in step S505 and the movement of fanning is detected in step S603, the control unit 300 decides to perform control so as to lower the temperature in the vehicle. For example, if an utterance relating to sound (e.g., "loud") is detected in step S506, the control unit 300 decides to perform control so as to lower the volume of an acoustic apparatus 220. For example, if an utterance relating to brightness (e.g., "too bright") is detected in step S508 and an action of frowning is detected in step S603, the control unit 300 decides to perform control so as to lower the brightness inside the vehicle. Also, for example, if the result of estimating the purpose of use is that use of the service is for the purpose of chatting, and if it is determined as a result of the determination in step S704 that the vehicle 104 has approached a famous location, the control unit 300 decides to perform control so as to display a description about the famous location on a wall surface inside of the vehicle 104. Also, if it is determined in steps S509 and S604 as a result of the analysis in step S110 that, for example, conversation between the passengers has become lively, the control unit 300 may also decide to perform control for making the environment in the vehicle livelier. For example, in this case, the control unit 300 decides to perform control so as to change the BGM to an up-tempo song.

If it is determined in step S702 as a result of the analysis of step S110 that the vibration is a threshold value or more and if it is determined in step S703 that noise is a threshold value or more, the control unit 300 decides to perform control so as to change the travel route of the vehicle 104, such as making a detour around locations where noise is generated, based on the map information 311, the traffic information 312, and the environment information 313. Also, for example, if words such as "I need to use the bathroom" are detected as a result of the determination of step S509, the control unit 300 decides to perform control so as to change the travel route in order to go through a rest area based on the map information 311, the traffic information 312, and the environment information 313. Also, for example, if it is recognized in steps S509 and S604 that conversation between the passengers has decreased, the passengers are not looking each other in the eye, or the like, the control unit 300 decides to perform control so as to change to a travel route on which there is a greater number of appearances of smiles, based on the learning results of the user information 319 (including other users). Also, for example, if the result of estimating the purpose of use is that use of the service is for the purpose of chatting, and if it is determined as a result of the determination in step S704 that the vehicle 104 has approached a famous location, the control unit 300 decides to perform control so as to reduce the travel speed of the vehicle 104.

In step S111, the control unit 300 transmits data for notifying the passengers 111 of the content of the control that was decided on to the control unit 200 of the vehicle 104. Based on the received data, the control unit 200 of the vehicle 104 notifies the display apparatus 217 of the message. Here, the message that is subjected to notification is, for example, a message such as "Lowering temperature.", according to which the passengers 111 can check the content of the control. Then, in step S112, the control unit 300 transmits setting data for performing the control that was decided on to the control unit 200 of the vehicle 104. The control unit 200 of the vehicle 104 uses the device control unit 206 to control the devices based on the received setting data. Alternatively, the control unit 200 of the vehicle 104 controls the traveling of the vehicle 104 based on the received setting data (route change, speed control). After step S112, the processing of step S107 is repeated. Also, after the environment change inside of the vehicle 104 in step S112, the control unit 300 may also receive a request for further change through a dialogue on a screen or an audio dialogue, such as "Temperature has been lowered. Is this OK?".

If it is determined in step S109 that no factor for an environment change has occurred, the processing advances to step S113, and the control unit 300 determines whether or not the time of ending the space provision service is coming soon. For example, the control unit 300 determines that the ending time is coming soon if the usage end time is coming soon or if the vehicle 104 is near the destination. If it is determined that the ending time is coming soon, the processing advances to step S114, and the control unit 300 instructs the control unit 200 of the vehicle 104 to notify the passengers 111. On the other hand, if it is determined that the ending time is not coming soon, the processing starting from step S107 is repeated.

The notification in step S114 performed by, for example, using the display apparatus 217 and the speaker 215 to output a message stating that the ending time is coming soon. The notification may also be performed by using the audio apparatus 220 to change the BGM. If the result of estimating the purpose is that use of the service is for the purpose of napping, the notification may also be performed by changing the reclining angle of the seat or changing the brightness of the lighting apparatus 223.

In step S115, the control unit 300 determines whether or not to end the space provision service. For example, upon recognizing that the vehicle 104 has stopped, the control unit 300 may also display the message "Ending service." on the display apparatus 217 and receive confirmation. Upon receiving the confirmation, the processing of FIG. 5 ends.

As described above, according to the present embodiment, as a result of various types of recognition relating to the passengers 111 riding in the vehicle 104, the travel route of the vehicle and the space in the vehicle are set automatically without an operation performed by the passengers 111, based on the requests of the passengers 111 (usage time, etc.). Also, the environment in the vehicle 104 and the travel route are changed according to the result of monitoring the passengers 111 while the vehicle is traveling. As a result, it is possible to provide a comfortable in-vehicle space to the passengers 111.

SUMMARY OF THE EMBODIMENT

A control apparatus (300) according to the present embodiment includes: a first information acquisition circuit (305, 306) configured to acquire a recognition result relating to a passenger of a vehicle; a second information acquisition circuit (304) configured to acquire information relating to a surrounding environment of the vehicle; and a vehicle control circuit (300, 309) configured to generate a travel route of the vehicle based on the recognition result acquired by the first information acquisition circuit and the information relating to the surrounding environment acquired by the second information acquisition circuit, in which the information relating to the surrounding environment includes information relating to a route set according to the recognition result.

According to this configuration, it is possible to generate a travel route based on multiple different factors. For example, it is possible to generate a travel route based on an external noise state of a route selected according to the purpose of business and a usage time.

Also, if the recognition result acquired by the first information acquisition circuit changes, the vehicle control circuit generates the travel route of the vehicle based on the changed recognition result and the information relating to the surrounding environment. According to this configuration, for example, if content such as "noisy" is spoken by a passenger, a travel route that makes a detour around a location at which external noise occurs can be generated.

Also, the information relating to the surrounding environment includes information relating to at least one of sound and vibration generated outside of the vehicle. According to this kind of configuration, for example, a travel route can be generated based on noise outside of the vehicle.

Also, the recognition result includes at least one of a recognition result of audio of the passenger, a recognition result of an image of the passenger, and sensor information of the passenger. Also, the sensor information includes biological information of the passenger. Also, the recognition result is classified as a predetermined emotion and stored.

According to this configuration, for example, the travel route can be generated based on the results of audio recognition of passengers, the results of image recognition, and biological information detected by sensors. Also, the travel route can be generated based on the emotion of the passengers.

Also, the vehicle control circuit further controls an environment inside of the vehicle based on the recognition result and the information relating to the surrounding environment. Also, control of the environment inside of the vehicle is control of at least one of temperature, sound, smell, and brightness inside of the vehicle.

According to this configuration, for example, the air conditioning in the vehicle can be controlled according to the behavior of the passenger.

Also, the vehicle control circuit further controls a speed of the vehicle. According to this configuration, for example, it is possible to perform control such that the speed is reduced when the vehicle travels near a famous sightseeing location.

Also, the recognition result includes recognition that the passenger has boarded the vehicle, and acquisition of the information relating to the surrounding environment by the second information acquisition circuit and generation of the travel route of the vehicle by the vehicle control circuit are performed in a period from when the passenger boards the vehicle to when the vehicle starts travel. Also, the vehicle control circuit further starts the travel of the vehicle according to an instruction given by the passenger.

According to this configuration, for example, it is possible to start the traveling of the vehicle using input of the usage start time and the usage end time by the passenger as a trigger.

The invention is not limited to the foregoing embodiments, and various variations/changes are possible within the spirit of the invention.

What is claimed is:

1. A control apparatus comprising:
    a first information acquisition circuit configured to acquire a recognition result relating to a passenger of a vehicle;
    an estimation circuit configured to estimate a purpose of using an in-vehicle space based on the recognition result acquired when the passenger has boarded the vehicle;
    a vehicle control circuit configured to generate a travel route of the vehicle based on the estimated purpose of using the in-vehicle space; and
    a second information acquisition circuit configured to acquire information relating to a surrounding environment of the vehicle,
    wherein, after travel of the vehicle is started based on the generated travel route of the vehicle, the vehicle control unit further performs vehicle control based on the recognition result acquired by the first information acquisition circuit and the information relating to the surrounding environment acquired by the second information acquisition circuit,
    the vehicle control includes controlling an environment inside of the vehicle and changing the generated travel route of the vehicle.

2. The control apparatus according to claim 1, wherein if the recognition result acquired by the first information acquisition circuit changes, the vehicle control circuit generates the travel route of the vehicle based on the changed recognition result and the information relating to the surrounding environment.

3. The control apparatus according to claim 1, wherein the information relating to the surrounding environment includes information relating to at least one of sound and vibration generated outside of the vehicle.

4. The control apparatus according to claim 1, wherein the recognition result includes at least one of a recognition result of audio of the passenger, a recognition result of an image of the passenger, and sensor information of the passenger.

5. The control apparatus according to claim 4, wherein the sensor information includes biological information of the passenger.

6. The control apparatus according to claim 1, wherein the recognition result is classified as a predetermined emotion and stored.

7. The control apparatus according to claim 1, wherein control of the environment inside of the vehicle is control of at least one of temperature, sound, smell, and brightness inside of the vehicle.

8. The control apparatus according to claim 1, wherein the vehicle control circuit further controls a speed of the vehicle.

9. The control apparatus according to claim 1, wherein
    the recognition result includes recognition that the passenger has boarded the vehicle, and
    acquisition of the information relating to the surrounding environment by the second information acquisition circuit and generation of the travel route of the vehicle by the vehicle control circuit are performed in a period from when the passenger boards the vehicle to when the vehicle starts travel.

10. The control apparatus according to claim 9, wherein the vehicle control circuit further starts the travel of the vehicle according to an instruction given by the passenger.

11. The control apparatus according to claim 1, wherein the recognition result acquired when the passenger has boarded the vehicle includes a number of passengers.

12. The control apparatus according to claim 11, wherein, if the number of passengers is one, the estimation circuit estimates that the purpose of using the in-vehicle space is napping.

13. The control apparatus according to claim 11, wherein if the number of passengers is plural, the estimation circuit estimates the purpose of using the in-vehicle space based on an article worn by the passenger, an item of the passenger, audio of the passenger, and behavior of the passenger.

14. The control apparatus according to claim 13, wherein if the number of passengers is plural, the estimated purpose of using the in-vehicle space includes at least one of business or chatting.

15. The control apparatus according to claim 13, wherein the generated travel route of the vehicle if the estimated purpose of using the in-vehicle space is business and the generated travel route of the vehicle if the estimated purpose of using the in-vehicle space is chatting are different from each other.

16. A control method to be executed by a control apparatus, the control method comprising:
    acquiring a recognition result relating to a passenger of a vehicle;
    estimating a purpose of using an in-vehicle space based on the recognition result acquired when the passenger has boarded the vehicle;
    generating a travel route of the vehicle based on the estimated purpose of using the in-vehicle space;
    acquiring information relating to a surrounding environment of the vehicle; and
    after travel of the vehicle is started based on the generated travel route of the vehicle, performing vehicle control based on the acquired recognition result and the acquired information relating to the surrounding environment, and
    the vehicle control including controlling an environment inside of the vehicle and changing the generated travel route of the vehicle.

17. A non-transient computer-readable storage medium storing program instructions executable by a computer, the instructions comprising:
    acquiring a recognition result relating to a passenger of a vehicle;
    estimating a purpose of using an in-vehicle space based on the recognition result acquired when the passenger has boarded the vehicle;
    generating a travel route of the vehicle based on the estimated purpose of using the in-vehicle space;
    acquiring information relating to a surrounding environment of the vehicle; and
    after travel of the vehicle is started based on the generated travel route of the vehicle, performing vehicle control based on the acquired recognition result and the acquired information relating to the surrounding environment, and the vehicle control includes controlling an environment inside of the vehicle and changing the generated travel route of the vehicle.

\* \* \* \* \*